United States Patent
Abe et al.

(10) Patent No.: US 8,284,462 B2
(45) Date of Patent: Oct. 9, 2012

(54) IMAGE READING DEVICE AND IMAGE FORMING APPARATUS

(75) Inventors: Issei Abe, Kanagawa (JP); Kiichiro Nishina, Kanagawa (JP); Masahiro Itoh, Kanagawa (JP); Kazuhiro Fujita, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 610 days.

(21) Appl. No.: 12/508,174

(22) Filed: Jul. 23, 2009

(65) Prior Publication Data

US 2010/0020367 A1    Jan. 28, 2010

(30) Foreign Application Priority Data

Jul. 25, 2008    (JP) ................................. 2008-192835

(51) Int. Cl.
*H04N 1/04* (2006.01)

(52) U.S. Cl. ........ 358/484; 358/488; 358/501; 359/649; 359/770; 353/102; 353/77

(58) Field of Classification Search ................. 358/484, 358/501, 474, 488; 359/714, 715, 770, 649, 359/650, 459; 353/70, 77, 102, 99
See application file for complete search history.

(56) References Cited

U.S. PATENT DOCUMENTS

| | | | | |
|---|---|---|---|---|
| 4,094,586 A * | 6/1978 | Sato et al. | ...................... | 359/683 |
| 6,728,511 B2 * | 4/2004 | Watanabe | ...................... | 399/405 |
| 6,771,427 B1 * | 8/2004 | Matsuo | .......................... | 359/649 |
| 6,807,014 B2 * | 10/2004 | Kawasaki | ...................... | 359/687 |
| 6,873,476 B2 * | 3/2005 | Shafer | ............................ | 359/731 |
| 7,048,388 B2 * | 5/2006 | Takaura et al. | ................... | 353/99 |
| 7,441,908 B2 * | 10/2008 | Takaura et al. | ................... | 353/99 |
| 7,542,211 B2 * | 6/2009 | Togino | ............................ | 359/637 |
| 7,671,907 B2 * | 3/2010 | Kobayashi et al. | ......... | 348/240.2 |

FOREIGN PATENT DOCUMENTS

| | | |
|---|---|---|
| JP | 5-3528 | 1/1993 |
| JP | 5-83717 | 11/1993 |
| JP | 9-205523 | 8/1997 |
| JP | 2686002 | 8/1997 |
| JP | 2710211 | 10/1997 |
| JP | 2002-107631 | 4/2002 |
| JP | 2003-66335 | 3/2003 |
| JP | 2004-109793 | 4/2004 |

* cited by examiner

*Primary Examiner* — Negussie Worku

(74) *Attorney, Agent, or Firm* — Oblon, Spivak, McClelland, Maier & Neustadt, L.L.P.

(57) ABSTRACT

Disclosed is an image reading device configured to read information of an object, including an imaging optical system configured to image an image of an object and an image-capturing device configured to image-capture at least a portion of the image imaged by the imaging optical system, wherein the imaging optical system includes a first optical system configured to image an intermediate image of the object and a second optical system configured to image the imaged image of the intermediate image.

12 Claims, 24 Drawing Sheets

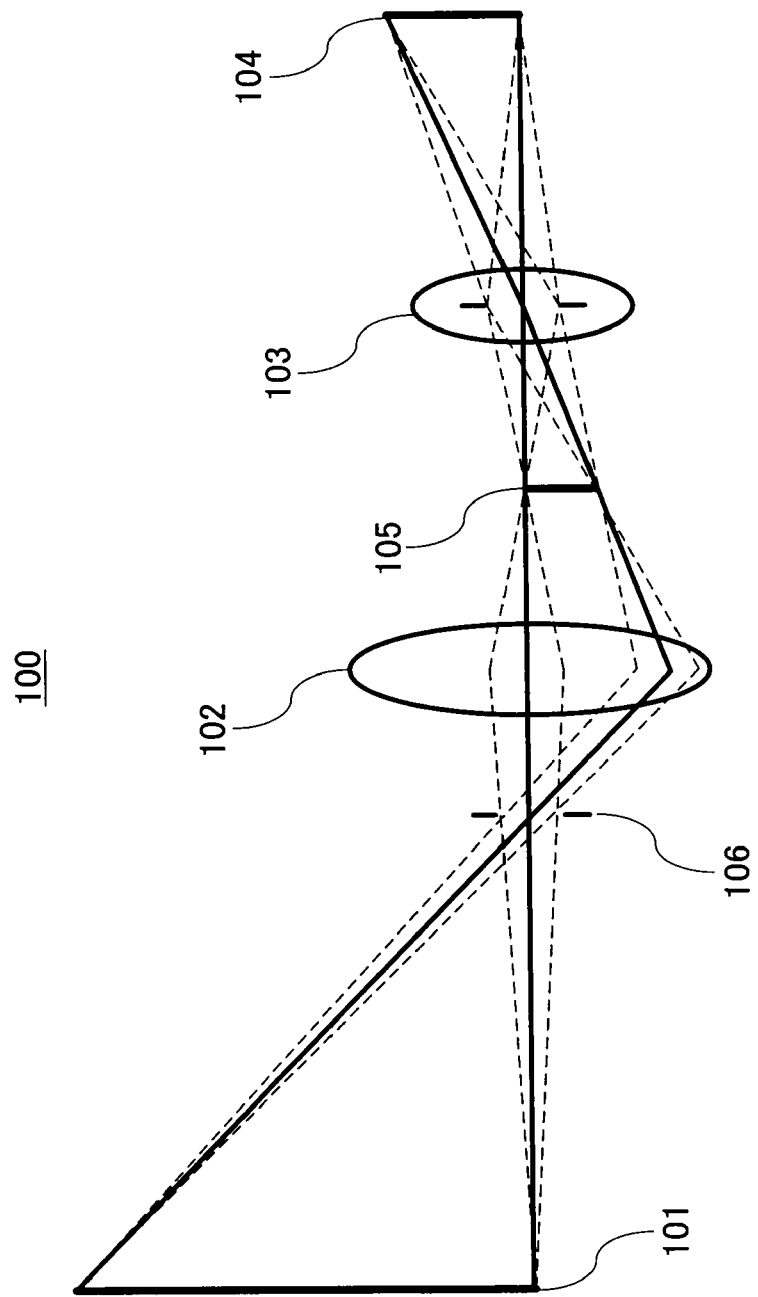

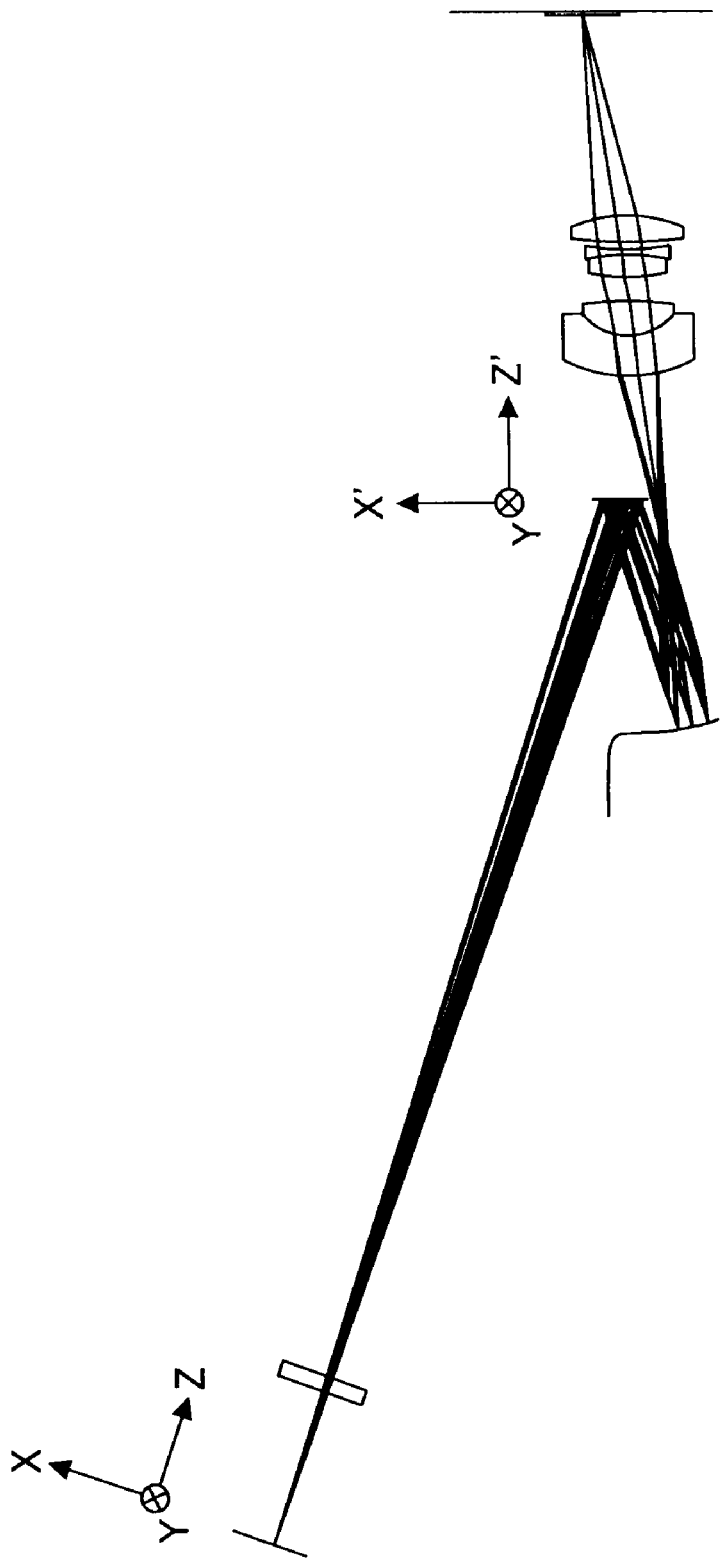

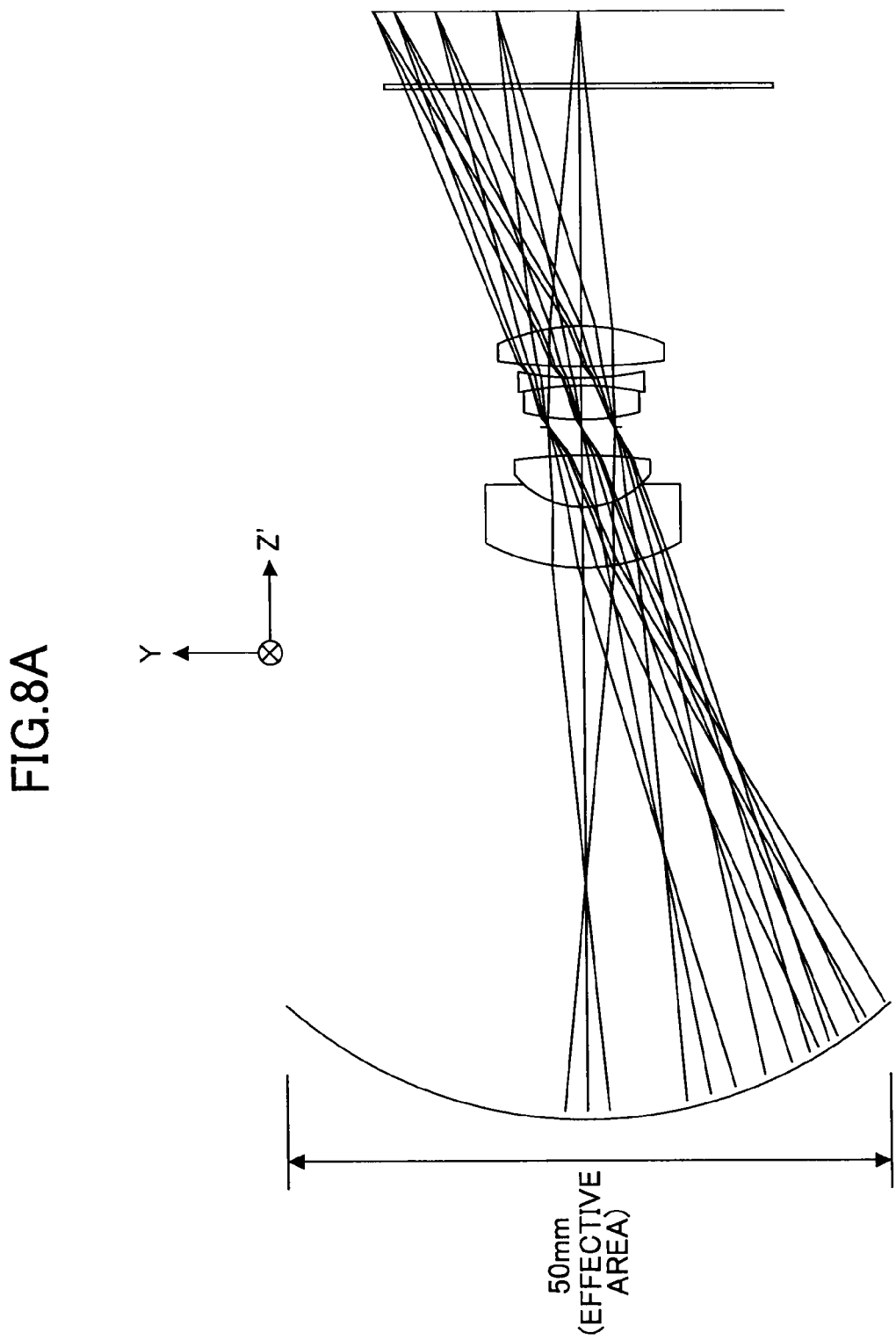

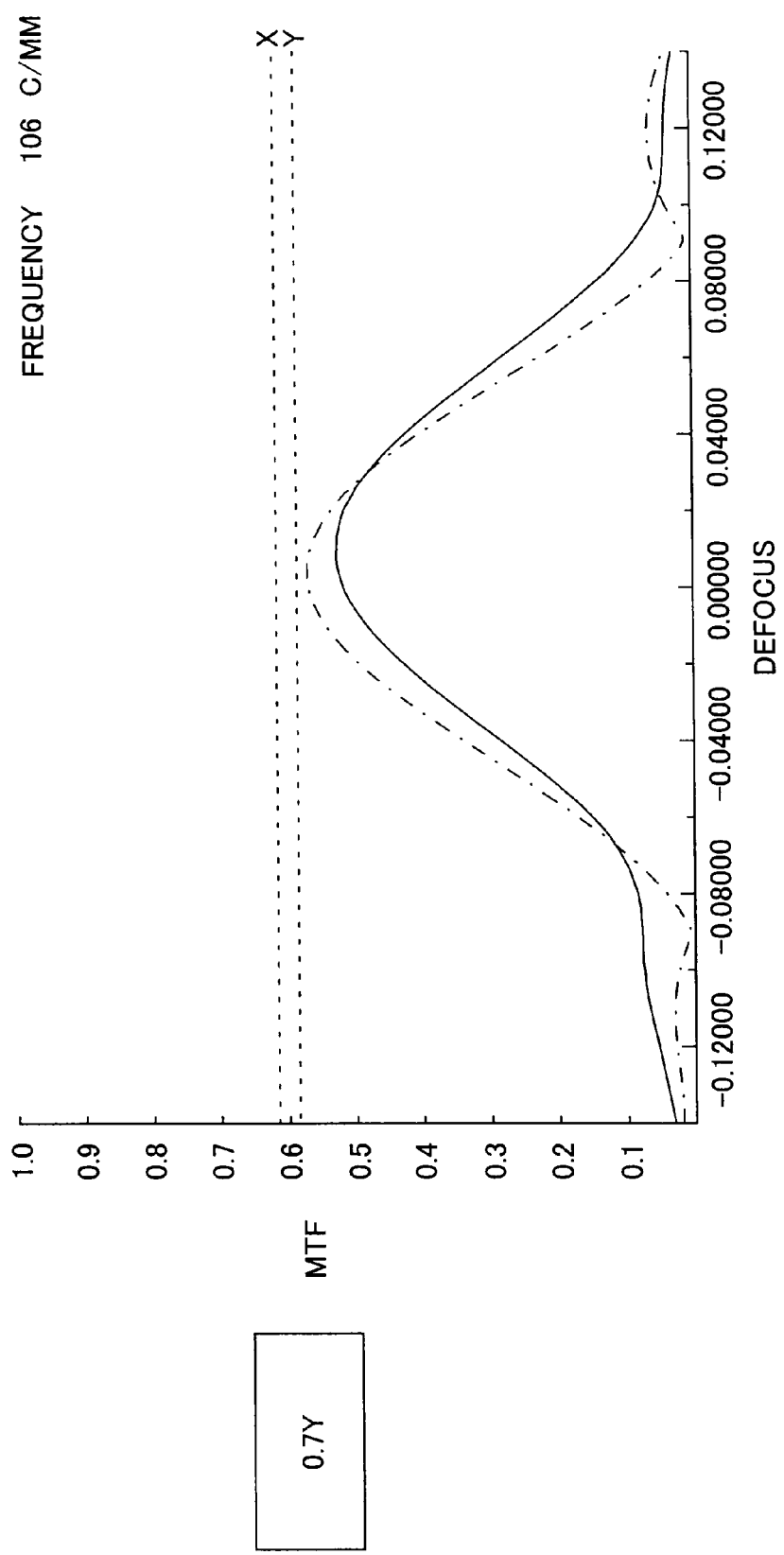

IMAGE READING DEVICE AND IMAGE FORMING APPARATUS

BACKGROUND OF THE INVENTION

1. Field of the Invention

The present invention relates to an image reading device and an image forming apparatus.

2. Description of the Related Art

Various techniques for an image reading device, image reading method, image forming apparatus or image forming method have been developed until now.

For example, Japanese Patent Application Publication No. 2002-107631 discloses a reading optical system including at least a lens group that is rotationally symmetric with respect to its optical axis and at least one free-form surface mirror and projecting a picture of an original copy onto a one-dimensional image-capturing device in an image reading device, characterized in that the shape of a reflection surface of the free-form surface mirror is symmetric with respect to a plane including the intersection of the reflection surface of the free-form surface mirror with the optical axis of the lens group and being perpendicular to the one-dimensional arrangement direction of the image-capturing device and the shape of the reflection surface of the free-form surface mirror is asymmetric with respect to a plane including the normal line of the free-form surface mirror at the intersection and being parallel to the one-dimensional arrangement direction of the image-capturing device.

In the reading optical system disclosed in Japanese Patent Application Publication No. 2002-107631, the free-form surface mirror is used in addition to the lens group, whereby the number of lenses included in the lens group is reduced. In a practical example disclosed in Japanese Patent Application Publication No. 2002-107631, a free-form surface mirror having a positive power is not arranged at an object side but at an image side, whereby a portion of aberration that may not sufficiently be corrected by only the lenses is corrected by the mirror.

However, it may be difficult to obtain a wide angle reading optical system because no intermediate image is formed at the object side, and an object distance for the reading optical system may be increased. In a practical example disclosed in Japanese Patent Application No. 2002-107631, the distance from an object to an image (object-to-image distance) is 496 mm for a reading optical system with a reduction magnification of 0.16535 at an object height of 150 mm and thus the overall length of the reading optical system has been increased. Accordingly, the thickness of an apparatus containing the reading optical system is also increased, whereby the whole size of the apparatus is increased. Then, even if the long optical path between an object and the lens group is folded by a plane mirror(s) in order to reduce the size of the apparatus, the number of folds (number of plane mirrors) is increased, whereby the costs for processes of production, arrangement and positional adjustment of the plane mirrors are increased.

Furthermore, the free-form surface mirror is arranged in the optical path between the lens group and an image, whose optical path length is short, namely, the optical path at reduction side (image side). Therefore, when an image-capturing device arranged at the reduction side of the reading optical system is installed, only a small space may be provided for positional adjustment of the image-capturing device and the positional adjustment of the image-capturing device may be difficult.

Furthermore, Japanese Patent Application No. 05-003528 discloses an image reading device in which an optical head including a one-dimensional reading element and optical imaging means opposing to the reading element are arranged so as to oppose to a two-dimensional original copy of a picture and the original copy of a picture and the optical head are moved relatively, characterized in that an concave mirror is used as the optical imaging means.

For a reading optical system of an image reading device disclosed in Japanese Patent Application Publication No. 05-003528, only a concave mirror that generates no chromatic aberration is used as the optical imaging means. Because imaging is conducted by only one concave mirror having a power in a practical example disclosed in Japanese Patent Application No. 05-003528, it may be difficult to correct an aberration except chromatic aberrations. Therefore, it may be difficult to obtain a wide angle reading optical system whereby an object-to-image distance of the reading optical system may be increased. Accordingly, the thickness of the image reading device is increased, whereby the size of the image reading device is increased.

Moreover, Japanese Patent Application Publication No. 2004-109793 discloses an image reading device including an imaging lens for imaging picture information of an original copy and a solid state image-capturing device for reading the picture information, characterized in that a mirror having an anamorphic surface is arranged in the optical path between the imaging lens and the solid state image-capturing device.

In the image reading device disclosed in Japanese Patent Application No. 2004-109793, the mirror having an anamorphic surface is arranged in the optical path between the imaging lens and the solid state image-capturing device, namely, at an image side, whereby a portion of aberration that may not sufficiently be corrected by the lens is corrected by the mirror, similarly to the reading optical system disclosed in Japanese Patent Application Publication No. 2002-107631, in order to correct the difference between the imaging positions of the imaging lens in its main scanning direction and sub-scanning direction.

However, it may be difficult to obtain a wide angle optical system because no intermediate image is formed at an object side, whereby an object-to-image distance for the optical system may be increased. Therefore, the thickness of an image reading device including the optical system may be increased whereby the whole size of the image reading device may be increased.

Meanwhile, the inventors have found that a comparatively wide angle optical system having a comparatively small object-to-image distance is provided and a comparatively compact image reading device in which the number of a fold(s) of an optical path of an optical system is comparatively small and a size of its housing is comparatively small is provided by using such an optical system.

SUMMARY OF THE INVENTION

According to one aspect of the present invention, there is provided an image reading device configured to read information of an object, including an imaging optical system configured to image an image of an object and an image-capturing device configured to image-capture at least a portion of the image imaged by the imaging optical system, wherein the imaging optical system includes a first optical system configured to image an intermediate image of the object and a second optical system configured to image the imaged image of the intermediate image.

According to another aspect of the present invention, there is provided an image forming apparatus configured to form an image on an image carrier, including an image reading device configured to read information of an object, the image reading device including an imaging optical system configured to image an image of an object and an image-capturing device configured to image-capture at least a portion of the image imaged by the imaging optical system, and a device configured to form an image on the image carrier using information of an object read by the image reading device, wherein the imaging optical system includes a first optical system configured to image an intermediate image of the object and a second optical system configured to image the imaged image of the intermediate image.

BRIEF DESCRIPTION OF THE DRAWINGS

FIG. 1A and FIG. 1B are diagrams illustrating one example of an imaging optical system in an image reading device according to one embodiment of the present invention.

FIG. 7 is a diagram illustrating the configuration of an imaging optical system of numerical value practical example 1 in an image reading device according to one embodiment of the present invention.

FIG. 8A and FIG. 8B are enlarged views of a reflection surface having a positive power and a lens system having a positive power in the imaging optical system of numerical value practical example 1.

FIG. 9A, FIG. 9B, FIG. 9C, FIG. 9D, and FIG. 9E are diagrams illustrating the resolution performance of the imaging optical system of numerical value practical example 1.

DETAILED DESCRIPTION OF THE PREFERRED EMBODIMENTS

Figure 1B:
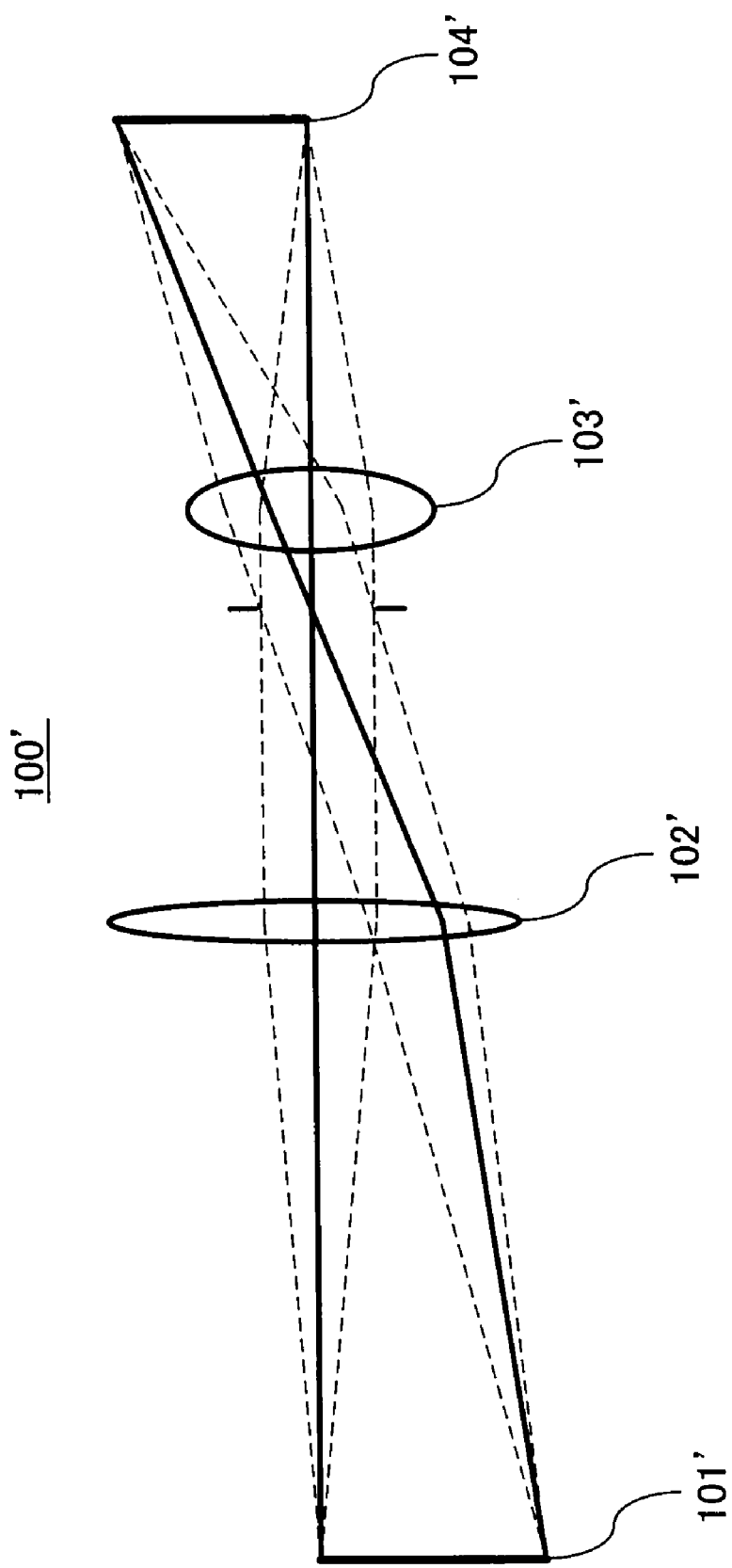

Next, at least one illustrative embodiment of the present invention will be described in conjunction with the drawings.

A first illustrative embodiment of the present invention is an image reading device for reading information of an object, which includes an imaging optical system for imaging an image of an object and an image-capturing device for image-capturing at least a portion of the image imaged by the imaging optical system, characterized in that the imaging optical system includes a first optical system for imaging an intermediate image of the object and a second optical system for imaging the imaged image of the intermediate image.

Herein, imaging includes both imaging of an image with no aberration and imaging of an image with an aberration(s). In other words, an image includes both an image with no aberration and an image with an aberration(s). Furthermore, an object and an intermediate image are in a conjugate relation with respect to a first optical system and an intermediate image and an imaged image are in a conjugate relation with respect to a second optical system so that the object and the imaged image are in a conjugate relation with respect to an imaging optical system. An object may preferably be an original copy of an object on an original copy surface provided in an image reading device.

According to the first illustrative embodiment of the present invention, it may be possible to provide a more compact image reading device. In particular, according to the first illustrative embodiment of the present invention, because the imaging optical system includes a first optical system for imaging an intermediate image of the object and a second optical system for imaging the imaged image of the intermediate image, that is, an intermediate image is formed, it may be possible to provide a first optical system having a large power. As a result, it may be possible to provide an imaging optical system with a comparatively small object-to-image distance and a comparatively wide angle. Furthermore, it may be possible to reduce a size of an image reading device including an imaging optical system accordingly. For example, because an object-to-image distance for an imaging optical system is comparatively small, an optical path length from an object to a first optical system may be small. As a result, it may be possible to reduce a thickness of an image reading device in its vertical direction. Furthermore, it may be possible to reduce a number of a fold(s) or a number of a reflection surface(s) having no power even when an optical path from an object to a first optical system is folded by a reflection surface having no power. As a result, it may be possible to reduce, a cost of manufacturing of a reflection surface having no power such as processing and vapor deposition of the reflection surface having no power, and a labor of positional adjustment and a time period of installation of the reflection surface having no power when the reflection surface having no power is installed in an image reading device.

For example, it may be possible to use an image reading device according to the first illustrative embodiment of the preset invention for an image reading device including a reading optical system such as an original copy reading part of a facsimile or digital copying machine or a reading optical system of each kind of image scanner.

An image reading device according to the first illustrative embodiment of the present invention is preferably an image reading device characterized in that the first optical system includes a reflection surface having a positive power and the second optical system includes a lens system having an optical axis and having a positive power.

Herein, a reflection surface having a positive power means being a concave reflection surface specifically. Furthermore, a shape of a reflection surface having a positive power may be either a spherical shape or an aspherical shape, and preferably, is an aspherical shape such as a shape of axially symmetric aspherical surface or a shape of anamorphic and aspherical surface in order to correct or reduce an aberration(s) of an imaging optical system. Furthermore, a number of the reflection surface(s) having a positive power may be either one or more, and preferably, is one in order to reduce a size of a configuration of an imaging optical system.

Moreover, a lens system having an optical axis and a positive power is composed of one or more lenses. A lens system having an optical axis means that, when the lens system is composed of plural lenses, an optical axis of the plural lenses constituting the lens system is completely or substantially coaxial and there is completely or substantially no shift or tilt of the optical axis of the plural lenses constituting the lens system. A lens system having a positive power includes at least one lens having a positive power, and may include a lens having a negative power if an entire of the lens system has a positive power. Additionally, a lens system preferably includes both a lens having a positive power and a lens having a negative power in order to correct or reduce an aberration(s) of an imaging optical system. Furthermore, each lens included in a lens system having a positive power may be either a spherical lens or an aspherical lens. When a lens system having a positive power includes an aspherical lens, it may be possible to reduce or correct an aberration(s) of an imaging optical system better. As a result, it may be possible to provide an image reading device including an imaging optical system with a better resolution performance. Furthermore, a number of a lens(es) included in a lens system having a positive power is not particularly limited and is appropriately selected depending on a balance between an optical performance(s) and cost of an imaging optical system included in an image reading device.

In this case, it may be possible to provide a more compact image reading device more easily. In particular, because the first optical system includes a reflection surface having a positive power and the second optical system includes a lens system having an optical axis and a positive power, it may be possible to obtain an imaging optical system more easily in which an intermediate image that is a real image is formed in an optical path between a first optical system and a second optical system. Because an intermediate image is thus formed in an optical path between a first optical system and a second optical system, it may be possible to provide a first optical system including a reflection surface having a large and positive power more easily. As a result, it may be possible to provide an imaging optical system with a comparatively small object-to-image distance and a comparatively wide angle more easily.

An image reading device according to the first illustrative embodiment of the present invention is preferably an image reading device characterized in that the imaging optical system further includes at least one reflection surface folding an optical path from the object to the imaged image and having no power.

Herein, a reflection surface having no power means being a reflection surface having completely or substantially no power. In other words, a reflection surface having no power means a completely or substantially planar reflection surface.

In this case, it may be possible to provide an even more compact image reading device. That is, because the imaging optical system further includes at least one reflection surface folding an optical path from the object to the imaged image and having no power, an optical path from an object to an imaged image is folded whereby it may be possible to reduce a size of an imaging optical system in a direction perpendicular to the object. As a result, it may be possible to reduce a size of an image reading device in a direction perpendicular to an object.

An image reading device according to the first illustrative embodiment of the present invention is preferably an image reading device characterized in that the at least one reflection surface folding an optical path from the object to the imaged image and having no power includes at least one reflection surface folding an optical path from the object to the reflection surface having a positive power and having no power.

Herein, when a number of a reflection surface(s) having a positive power is plural, an optical path from an object to a reflection surface having a positive power means an optical path from an object to a reflection surface having a positive power closest to the object.

In this case, it may be possible to provide an even more compact image reading device. That is, because the at least one reflection surface folding an optical path from the object to the imaged image and having no power includes at least one reflection surface folding an optical path from the object to the reflection surface having a positive power and having no power, an optical path from an object to a reflection surface having a positive power is folded, whereby it may be possible to reduce a size of an imaging optical system in a direction perpendicular to an object more significantly. As a result, it may be possible to reduce a size of an image reading device in a direction perpendicular to an object more significantly.

An image reading device according to the first illustrative embodiment of the present invention is preferably an image reading device characterized in that a reflection surface having no power closest to the reflection surface having a positive power in the at least one reflection surface folding an optical path from the object to the reflection surface having a positive power and having no power is arranged at a position of the intermediate image or a position between the intermediate image and the lens system having a positive power with respect to a direction of the optical axis of the lens system.

Herein, "a reflection surface having no power closest to the reflection surface having a positive power being arranged at a position of the intermediate image or a position between the intermediate image and the lens system having a positive power with respect to a direction of the optical axis of the lens system" means that a point of intersection of a reflection surface having no power closest to a reflection surface having a positive power with an optical axis of a lens system is present at a position of an intermediate image on the optical axis of the lens system or at a position between a position of an intermediate image on the optical axis of the lens system and a position of a point of intersection of a lens system having a positive power closest to a position of the intermediate image on the optical axis of the lens system with the optical axis of the lens system.

In this case, it may be possible to obtain an image reading device capable of obtaining a comparatively bright imaged image or an imaged image with a comparatively high resolution performance.

More particularly, because a reflection surface having no power closest to the reflection surface having a positive power is arranged at a position of the intermediate image or a position between the intermediate image and the lens system having a positive power with respect to a direction of the optical axis of the lens system, it may be possible to reduce or avoid vignetting of a light ray(s) from the reflection surface having a positive power to the intermediate image which may otherwise by caused by the reflection surface having no power closest to the reflection surface having a positive power or vignetting of a light ray(s) from the reflection surface having no power closest to the reflection surface having a positive power to the reflection surface having a positive power which may otherwise be caused by the lens system having a positive power, whereby it may be possible to reduce or avoid vignetting of a light ray(s) from an object to an imaged image. As a result, it may be possible to image a light ray(s) from an object to an imaged image onto an image-capturing device more effectively, whereby it may be possible to obtain an image reading device capable of obtaining a comparatively bright imaged image.

Alternatively, it is also considered that a tilt of a reflection surface having a positive power and/or a shift of an image-capturing device with respect to an optical axis of a lens system is increased in order to reduce or avoid vignetting of a light ray(s) from an object to an imaged image as described above, but in this case, an aberration(s) of an imaging optical system tend(s) to increase. When a reflection surface having no power closest to the reflection surface having a positive power is arranged at a position of the intermediate image or a position between the intermediate image and the lens system having a positive power with respect to a direction of an optical axis of the lens system, it may be possible to reduce or avoid vignetting of a light ray(s) from an object to an imaged image as described above whereby it may be possible to reduce a tilt of the reflection surface having a positive power and/or a shift of an image-capturing device with respect to the optical axis of the lens system. As a result, an aberration(s) of an imaging optical system may be reduced so that it may be possible to obtain an image reading device capable of obtaining an imaged image with a comparatively high resolution performance.

An image reading device according to the first illustrative embodiment of the present invention is preferably an image reading device characterized in that a reflection surface having no power closest to the reflection surface having a positive power in the at least one reflection surface folding an optical path from the object to the reflection surface having a positive power and having no power is arranged at a position of an entrance pupil of any one of a light ray(s) incident from the object to the reflection surface having a positive power.

Herein, "a reflection surface having no power closest to the reflection surface having a positive power being arranged at a position of an entrance pupil of any one of a light ray(s) incident from the object to the reflection surface having a positive power" means that a point of intersection of the reflection surface having no power closest to the reflection surface having a positive power with an optical axis of a lens system is present in a region of positions where principal rays emitted from all off-axial points on an object with respect to the optical axis of the lens system and being incident on the reflection surface having a positive power (light rays passing through a center of an aperture stop of an imaging optical system or centers of entrance pupils) intersect with the optical axis of the lens system.

In this case, it may be possible to provide an image reading device including a more compact imaging optical system. More particularly, because a reflection surface having no power closest to the reflection surface having a positive power is arranged at a position of an entrance pupil of any one of a light ray(s) incident from the object to the reflection surface having a positive power, it may be possible to arrange a reflection surface having no power closest to a reflection surface having a positive power at a location where light rays emitted from points on an object and being incident on the reflection surface having a positive power are comparatively densely collected. Then, because it may be only necessary for a reflection surface having no power closest to a reflection surface having a positive power to reflect comparatively densely collected light rays emitted from points on an object, it may be possible to reduce a size of the reflection surface having no power closest to a reflection surface having a positive power. Accordingly, it may be possible to provide a more compact imaging optical system.

An image reading device according to the first illustrative embodiment of the present invention is preferably an image reading device characterized in that a number of a lens(es) constituting the lens system and having a power is 3 or more and 6 or less. Furthermore, a number of a lens(es) constituting the lens system and having a power is more preferably 4 or more and 6 or less and even more preferably 4 or 5. Herein, a lens having a power includes a lens having a positive power and/or a lens having a negative power and is designed such that a lens system has a positive power.

In this case, it may be possible to provide an image reading device including an imaging optical system with a comparatively simple configuration and a comparatively good resolution performance. That is, because a number of a lens(es) constituting the lens system and having a power is 3 or more and 6 or less, it may be possible to provide an imaging optical system including a comparatively small number of lens(es) having a power and being provided with a comparatively good resolution performance.

An image reading device according to the first illustrative embodiment of the present invention is preferably an image reading device characterized in that an image surface of the intermediate image is curved so as to get closer to the lens system with increasing a distance from the optical axis of the lens system.

In this case, it may be possible to provide an image reading device including an imaging optical system with a comparatively good resolution performance. That is, because an image surface of the intermediate image is curved so as to get closer to the lens system with increasing a distance from the optical axis of the lens system, it may be possible that a field curvature of the intermediate image which is generated by a reflection surface having a positive power and gets closer to the lens system with increasing a distance from the optical axis of the lens system be reduced or canceled by a field curvature generated by a lens system having a positive power, whereby it may be possible to reduce or eliminate a field curvature of an imaging optical system. As a result, it may be possible to provide an imaging optical system with a comparatively good resolution performance. Furthermore, because it may be possible to reduce or eliminate a field curvature of an imaging optical system, it may also be possible to provide an imaging optical system with a wider angle (a larger field of view).

An image reading device according to the first illustrative embodiment of the present invention is preferably an image reading device characterized in that the reflection surface having a positive power has a shape of an anamorphic and aspherical surface. Additionally, a shape of an anamorphic and aspherical surface may also be called a shape of an anamorphic and free-form surface.

Herein, a shape of an anamorphic and aspherical surface is, for example, a shape of a surface represented by a formula of:

$$Z(x,y) = c \cdot r^2 / [1 + \{1-(1+k)c^2 r^2\}^{1/2}] + X4Y0 \cdot x^4 + X2Y2 \cdot x^2 y^2 + X0Y4 \cdot y^4 + X5Y0 \cdot x^5 + X3Y2 \cdot x^3 y^2 + X1Y4 \cdot x^1 y^4 + X6Y0 \cdot x^6 + X4Y2 \cdot x^4 y^2 + X2Y4 \cdot x^2 y^4 + X0Y6 \cdot y^6 + \ldots$$

Herein, if a direction of a normal line of an anamorphic and aspherical surface at a center (surface apex) of the anamorphic and aspherical surface is a Z-direction in the above-described formula;

x is a coordinate in a first direction orthogonal to Z-direction;

y is a coordinate in a second direction orthogonal to both Z-direction and the first direction;

r is a height in a direction perpendicular to Z-direction ($r^2=x^2+y^2$);

Z (x, y) is a distance (sag amount) from a tangential plane of the anamorphic and aspherical surface at the center thereof to the anamorphic and aspherical surface at coordinates (x, y);

c is a curvature (or a reciprocal of a radius of curvature) of an anamorphic and aspherical surface at the center of the anamorphic and aspherical surface;

k is a conic constant of the anamorphic and aspherical surface at the center of the anamorphic and aspherical surface; and X4Y0, X2Y2, X0Y4, X5Y0, X3Y2, . . . are coefficients of a term of $x^4$, term of $x^2y^2$, term of $y^4$, term of $x^5$, term of $x^3y^2$, . . . , respectively.

In this case, it may be possible to provide an image reading device including an imaging optical system with a comparatively good resolution performance. That is, because the reflection surface having a positive power has a shape of an anamorphic and aspherical surface, a degree of freedom of a design of a reflection surface having a positive power may be increased whereby it may be possible to correct or reduce an aberration(s) of an imaging optical system better. As a result, it may be possible to provide an imaging optical system with a comparatively good resolution performance. In particular, it may be possible to correct or reduce a distortion and/or field curvature which may be frequently and significantly generated in a comparatively wide angle imaging optical system, whereby it may be possible to obtain a comparatively wide angle imaging optical system with a comparatively good resolution performance.

An image reading device according to the first illustrative embodiment of the present invention is preferably an image reading device characterized in that the image-capturing device has pixels arranged in at least a first direction and is shifted to a direction perpendicular to both the first direction and a direction of the optical axis of the lens system with respect to the optical axis of the lens system.

Herein, the first direction in pixels arranged in at least a first direction means one of at least one direction in which pixels of an image-capturing device are arranged. For example, when an image-capturing device is a one-dimensional image capturing device, a first direction is a direction in which pixels of a one-dimensional image-capturing device are arranged. Furthermore, when an image-capturing device is a two-dimensional image-capturing device, it is one of two directions in which pixels of a two-dimensional image-capturing device are arranged. In particular, when the two-dimensional image-capturing device has pixels arranged in its longitudinal direction and lateral direction, a first direction is commonly the longitudinal direction.

In this case, it may be possible to provide an image reading device including a more compact imaging optical system more easily. More particularly, when particularly a first optical system includes a reflection surface having a positive power and a second optical system includes a lens system having an optical axis and having a positive power, partial separation (avoidance of complete coincidence) between a light ray(s) entering from an object to a reflection surface having a positive power and a light ray(s) emitted from the reflection surface having a positive power to a lens system having a positive power may be required in order to avoid or reduce vignetting of a light ray(s) from the object to an imaged image by the lens system having a positive power and/or an image-capturing device. For this purpose, it is considered that a reflection surface having a positive power is tilted and/or an image-capturing device is shifted, with respect to an optical axis of a lens system having a positive power. Herein, because the image-capturing device has pixels arranged in at least a first direction and is shifted to a direction perpendicular to both the first direction and a direction of an optical axis of the lens system with respect to the optical axis of the lens system, it may be possible to partially separate between a light ray(s) entering from an object to a reflection surface having a positive power and a light ray(s) emitted from the reflection surface having a positive power to a lens system having a positive power more easily. Accordingly, it may be possible to arrange an optical element(s) constituting an imaging optical system such as a reflection surface having a positive power and/or a lens system having a positive power more easily. That is, it may be possible to provide an imaging optical system more easily in which a first optical system includes a reflection surface having a positive power and a second optical system includes a lens system having an optical axis and having a positive power.

An image reading device according to the first illustrative embodiment of the present invention is preferably an image reading device characterized in that the image-capturing device has pixels arranged in at least a first direction and a length of the reflection surface having a positive power in a direction perpendicular to both the first direction and a direction of the optical axis of the lens system is a half or less of a length of the reflection surface having a positive power in the first direction. A length of the reflection surface having a positive power in a direction perpendicular to both the first direction and a direction of the optical axis of the lens system is more preferably one-fifth or less, and even more preferably one-tenth or less, of a length of the reflection surface having a positive power in the first direction.

Herein, a configuration such that "the image-capturing device has pixels arranged in at least a first direction" is the same as the one described above.

In this case, it may be possible to provide an image reading device including a more compact imaging optical system more easily. That is, because a length of the reflection surface having a positive power in a direction perpendicular to both the first direction and a direction of the optical axis of the lens system is a half or less of a length of the reflection surface having a positive power in the first direction, it may be possible to reduce a size of a reflection surface having a positive power whereby it may be possible to provide a more compact imaging optical system.

An image reading device according to the first illustrative embodiment of the present invention is preferably an image reading device characterized in that the image-capturing device has pixels arranged in at least a first direction and a length of the at least one reflection surface folding an optical path from the object to the imaged image and having no power in the first direction is less than a length of the reflection surface having a positive power in the first direction.

Herein, a configuration such that "the image-capturing device has pixels arranged in at least a first direction" is the same as the one described above.

In this case, it may be possible to provide an image reading device including a more compact imaging optical system more easily. That is, because a length of the at least one reflection surface folding an optical path from the object to the imaged image and having no power in the first direction is less than a length of the reflection surface having a positive power in the first direction, it may be possible to reduce a size of at least one reflection surface having no power whereby it may be possible to provide a more compact imaging optical system.

A second illustrative embodiment of the present invention is an image reading method for reading information of an object, characterized in that reading of information of an object using an image reading device according to the first illustrative embodiment is included.

According to the second illustrative embodiment of the present invention, it may be possible to provide an image reading method using a more compact image reading device, because an image reading device according to the first illustrative embodiment of the present invention is used whereby it may be possible to provide a more compact image reading device.

A third illustrative embodiment of the present invention is an image forming apparatus for forming an image on an image carrier, characterized in that the image reading device according to the first illustrative embodiment of the present invention and a device for forming an image on the image carrier using information of an object read by the image reading device are included.

Herein, an image in forming an image on an image carrier may be identical to or different from an image read by an image reading device. Furthermore, an image carrier may be, for example, a photoconductor body or a recoding medium such as a sheet of paper or plastic. Furthermore, an image formed on an image carrier may be an electrostatic latent image or an image of developer which may be obtained by developing an electrostatic latent image with a developer including a toner. In addition, a device for forming an image on an image carrier may include a publicly-known device(s) as used in an electrophotographic process, such as charging means for charging a photoconductor body, light exposure means (light-writing means) for writing an electrostatic latent image in a charged photoconductor body, such as an optical scanning device, development means for developing an electrostatic latent image formed on a photoconductor body with a developer, transfer means for transferring a developed image of developer to a recording medium, cleaning means for eliminating a developer remaining on a photoconductor body, and/or antistatic means for initializing an electric potential of a photoconductor body.

According to the third illustrative embodiment of the present invention, it may be possible to provide an image forming apparatus including a more compact image reading device, because an image reading device according to the first illustrative embodiment of the present invention is included whereby it may be possible to provide a more compact image reading device. As a result, it may be possible to provide a more compact image reading device.

A fourth illustrative embodiment of the present invention is an image forming method for forming an image on an image carrier, characterized in that forming of an image on the image carrier using the image forming apparatus according to the third illustrative embodiment of the present invention is included.

According to the fourth illustrative embodiment of the present invention, it may be possible to provide an image forming method using an image forming apparatus including a more compact image reading device, because an image forming apparatus according to the third illustrative embodiment of the present invention is used whereby it may be possible to provide an image forming apparatus including a more compact image reading device.

A fifth illustrative embodiment of the present invention is an imaging optical system for imaging an image of an object, characterized in that a first optical system for imaging an intermediate image of the object and a second optical system for imaging the image of the intermediate image are included.

Herein, imaging includes both imaging of an image with no aberration and imaging of an image with an aberration(s). In other words, an image includes both an image with no aberration and an image with an aberration(s). Furthermore, an object and an intermediate image are in a conjugate relation with respect to a first optical system and an intermediate image and an image are in a conjugate relation with respect to a second optical system so that the object and the image are in a conjugate relation with respect to an imaging optical system. Moreover, an object is not particularly limited. Additionally, in the fifth illustrative embodiment of the present invention, a term of a mere "image" does not mean an intermediate image but means an image obtained by imaging of an intermediate image which is conducted by a second optical system.

According to the fifth illustrative embodiment of the present invention, it may be possible to provide a more compact imaging optical system. In particular, according to the fifth illustrative embodiment of the present invention, because an imaging optical system for imaging an image of an object includes a first optical system for imaging an intermediate image of the object and a second optical system for imaging the image of the intermediate image, that is, an intermediate image is formed, it may be possible to provide a first optical system having a large power. As a result, it may be possible to provide an imaging optical system with a comparatively small object-to-image distance and a comparatively wide angle. For example, because an object-to-image distance for an imaging optical system is comparatively small, an optical path length from an object to a first optical system may be small. Furthermore, it may be possible to reduce a number of a fold(s) or a number of a reflection surface(s) having no power even when an optical path from an object to a first optical system is folded by a reflection surface having no power. As a result, it may be possible to reduce, a cost of manufacturing of a reflection surface having no power such as processing and vapor deposition of the reflection surface having no power, and a labor of positional adjustment and a time period of installation of the reflection surface having no power when the reflection surface having no power is installed in an image reading device.

For example, it may be possible to use an imaging optical system according to the fifth illustrative embodiment of the preset invention for an original copy reading part of a facsimile or digital copying machine or a reading optical system included in each kind of image scanner.

An imaging optical system according to the fifth illustrative embodiment of the present invention is preferably an imaging optical system characterized in that the first optical system includes a reflection surface having a positive power and the second optical system includes a lens system having an optical axis and having a positive power.

Herein, a reflection surface having a positive power means being a concave reflection surface specifically. Furthermore, a shape of a reflection surface having a positive power may be either a spherical shape or an aspherical shape, and preferably, is an aspherical shape such as a shape of axially symmetric aspherical surface or a shape of anamorphic and aspherical surface in order to correct or reduce an aberration(s) of an imaging optical system. Furthermore, a number of the reflection surface(s) having a positive power may be either one or more, and preferably, is one in order to reduce a size of a configuration of an imaging optical system.

Moreover, a lens system having an optical axis and a positive power is composed of one or more lenses. A lens system having an optical axis means that, when the lens system is composed of plural lenses, an optical axis of the plural lenses constituting the lens system is completely or substantially coaxial and there is completely or substantially no shift or tilt of the optical axis of the plural lenses constituting the lens system. A lens system having a positive power includes at least one lens having a positive power, and may include a lens having a negative power if an entire of the lens system has a positive power. Additionally, a lens system preferably includes both a lens having a positive power and a lens having a negative power in order to correct or reduce an aberration(s) of an imaging optical system. Furthermore, each lens included in a lens system having a positive power may be either a spherical lens or an aspherical lens. When a lens system having a positive power includes an aspherical lens, it may be possible to reduce or correct an aberration(s) of an imaging optical system better. As a result, it may be possible to provide an imaging optical system with a better resolution performance. Furthermore, a number of a lens(es) included in a lens system having a positive power is not particularly limited and is appropriately selected depending on a balance between an optical performance(s) and cost of an imaging optical system.

In this case, it may be possible to provide a more compact imaging optical system more easily. In particular, because the first optical system includes a reflection surface having a positive power and the second optical system includes a lens system having an optical axis and a positive power, it may be possible to obtain an imaging optical system more easily in which an intermediate image that is a real image is formed in an optical path between a first optical system and a second optical system. Because an intermediate image is thus formed in an optical path between a first optical system and a second optical system, it may be possible to provide a first optical system including a reflection surface having a large and positive power more easily. As a result, it may be possible to provide an imaging optical system with a comparatively small object-to-image distance and a comparatively wide angle more easily.

An imaging optical system according to the fifth illustrative embodiment of the present invention is preferably an imaging optical system characterized in that the imaging optical system further includes at least one reflection surface folding an optical path from the object to the image and having no power.

Herein, a reflection surface having no power means being a reflection surface having completely or substantially no power. In other words, a reflection surface having no power means a completely or substantially planar reflection surface.

In this case, it may be possible to provide an even more compact imaging optical system. That is, because the imaging optical system further includes at least one reflection surface folding an optical path from the object to the image and having no power, an optical path from an object to an image is folded whereby it may be possible to reduce a size of an imaging optical system in a direction perpendicular to the object. As a result, it may be possible to reduce a size of an imaging optical system in a direction perpendicular to an object.

An imaging optical system according to the fifth illustrative embodiment of the present invention is preferably an imaging optical system characterized in that the at least one reflection surface folding an optical path from the object to the image and having no power includes at least one reflection surface folding an optical path from the object to the reflection surface having a positive power and having no power.

Herein, when a number of a reflection surface(s) having a positive power is plural, an optical path from an object to a reflection surface having a positive power means an optical path from an object to a reflection surface having a positive power closest to the object.

In this case, it may be possible to provide an even more compact imaging optical system. That is, because the at least one reflection surface folding an optical path from the object to the image and having no power includes at least one reflection surface folding an optical path from the object to the reflection surface having a positive power and having no power, an optical path from an object to a reflection surface having a positive power is folded, whereby it may be possible to reduce a size of an imaging optical system in a direction perpendicular to an object more significantly. As a result, it may be possible to reduce a size of an imaging optical system in a direction perpendicular to an object more significantly.

An imaging optical system according to the fifth illustrative embodiment of the present invention is preferably an imaging optical system characterized in that a reflection surface having no power closest to the reflection surface having a positive power in the at least one reflection surface folding an optical path from the object to the reflection surface having a positive power and having no power is arranged at a position of the intermediate image or a position between the intermediate image and the lens system having a positive power with respect to a direction of the optical axis of the lens system.

Herein, "a reflection surface having no power closest to the reflection surface having a positive power being arranged at a position of the intermediate image or a position between the intermediate image and the lens system having a positive power with respect to a direction of the optical axis of the lens system" means that a point of intersection of a reflection surface having no power closest to a reflection surface having a positive power with an optical axis of a lens system is present at a position of an intermediate image on the optical axis of the lens system or at a position between a position of an intermediate image on the optical axis of the lens system and a position of a point of intersection of a lens system having a positive power closest to a position of the intermediate image on the optical axis of the lens system with the optical axis of the lens system.

In this case, it may be possible to obtain an imaging optical system capable of obtaining a comparatively bright image or an image with a comparatively high resolution performance.

More particularly, because a reflection surface having no power closest to the reflection surface having a positive power is arranged at a position of the intermediate image or a position between the intermediate image and the lens system having a positive power with respect to a direction of the optical axis of the lens system, it may be possible to reduce or avoid vignetting of a light ray(s) from the reflection surface having a positive power to the intermediate image which may otherwise by caused by the reflection surface having no power closest to the reflection surface having a positive power or vignetting of a light ray(s) from the reflection surface having no power closest to the reflection surface having a positive power to the reflection surface having a positive power which may otherwise be caused by the lens system having a positive power, whereby it may be possible to reduce or avoid vignetting of a light ray(s) from an object to an image. As a result, it may be possible to image a light ray(s) from an object to an image more effectively, whereby it may be possible to obtain an imaging optical system capable of obtaining a comparatively bright image.

Alternatively, it is also considered that a tilt of a reflection surface having a positive power and/or a shift of an image surface with respect to an optical axis of a lens system is increased in order to reduce or avoid vignetting of a light ray(s) from an object to an image as described above, but in this case, an aberration(s) of an imaging optical system tend(s) to increase. When a reflection surface having no power closest to the reflection surface having a positive power is arranged at a position of the intermediate image or a position between the intermediate image and the lens system having a positive power with respect to a direction of an optical axis of the lens system, it may be possible to reduce or avoid vignetting of a light ray(s) from an object to an image as described above whereby it may be possible to reduce a tilt of the reflection surface having a positive power and/or a shift of an image surface with respect to the optical axis of the lens system. As a result, an aberration(s) of an imaging optical system may be reduced so that it may be possible to obtain an imaging optical system capable of obtaining an image with a comparatively high resolution performance.

An imaging optical system according to the fifth illustrative embodiment of the present invention is preferably an imaging optical system characterized in that a reflection surface having no power closest to the reflection surface having a positive power in the at least one reflection surface folding an optical path from the object to the reflection surface having a positive path and having no power is arranged at a position of an entrance pupil of any one of a light ray(s) incident from the object to the reflection surface having a positive power.

Herein, "a reflection surface having no power closest to the reflection surface having a positive power being arranged at a position of an entrance pupil of any one of a light ray(s) incident from the object to the reflection surface having a positive power" means that a point of intersection of the reflection surface having no power closest to the reflection surface having a positive power with an optical axis of a lens system is present in a region of positions where principal rays emitted from all off-axial points on an object with respect to the optical axis of the lens system and being incident on the reflection surface having a positive power (light rays passing through a center of an aperture stop of an imaging optical system or centers of entrance pupils) intersect with the optical axis of the lens system.

In this case, it may be possible to provide a more compact imaging optical system. More particularly, because a reflection surface having no power closest to the reflection surface having a positive power is arranged at a position of an entrance pupil of any one of a light ray(s) incident from the object to the reflection surface having a positive power, it may be possible to arrange a reflection surface having no power closest to a reflection surface having a positive power at a location where light rays emitted from points on an object and being incident on the reflection surface having a positive power are comparatively densely collected. Then, because it may be only necessary for a reflection surface having no power closest to a reflection surface having a positive power to reflect comparatively densely collected light rays emitted from points on an object, it may be possible to reduce a size of the reflection surface having no power closest to a reflection surface having a positive power. Accordingly, it may be possible to provide a more compact imaging optical system.

An imaging optical system according to the fifth illustrative embodiment of the present invention is preferably an imaging optical system characterized in that a number of a lens(es) constituting the lens system and having a power is 3 or more and 6 or less. Furthermore, a number of a lens(es) constituting the lens system and having a power is more preferably 4 or more and 6 or less and even more preferably 4 or 5. Herein, a lens having a power includes a lens having a positive power and/or a lens having a negative power and is designed such that a lens system has a positive power.

In this case, it may be possible to provide an imaging optical system with a comparatively simple configuration and a comparatively good resolution performance. That is, because a number of a lens(es) constituting the lens system and having a power is 3 or more and 6 or less, it may be possible to provide an imaging optical system including a comparatively small number of lens(es) having a power and being provided with a comparatively good resolution performance.

An imaging optical system according to the fifth illustrative embodiment of the present invention is preferably an imaging optical system characterized in that an image surface of the intermediate image is curved so as to get closer to the lens system with increasing a distance from the optical axis of the lens system.

In this case, it may be possible to provide an imaging optical system with a comparatively good resolution performance. That is, because an image surface of the intermediate image is curved so as to get closer to the lens system with increasing a distance from the optical axis of the lens system, it may be possible that a field curvature of the intermediate image which is generated by a reflection surface having a positive power and gets closer to the lens system with increasing a distance from the optical axis of the lens system be reduced or canceled by a field curvature generated by a lens system having a positive power, whereby it may be possible to reduce or eliminate a field curvature of an imaging optical system. As a result, it may be possible to provide an imaging optical system with a comparatively good resolution performance. Furthermore, because it may be possible to reduce or eliminate a field curvature of an imaging optical system, it may also be possible to provide an imaging optical system with a wider angle (a larger field of view).

An imaging optical system according to the fifth illustrative embodiment of the present invention is preferably an imaging optical system characterized in that the reflection surface having a positive power has a shape of an anamorphic and aspherical surface. Additionally, a shape of an anamorphic and aspherical surface may also be called a shape of an anamorphic and free-form surface.

Herein, a shape of an anamorphic and aspherical surface is, for example, a shape of a surface represented by a formula of:

$$Z(x,y) = c \cdot r^2 / [1 + \{1-(1+k)c^2 r^2\}^{1/2}] + X4Y0 \cdot x^4 + X2Y2 \cdot x^2 y^2 + X0Y4 \cdot y^4 + X5Y0 \cdot x^5 + X3Y2 \cdot x^3 y^2 + X1Y4 \cdot x^1 y^4 + X6Y0 \cdot x^6 + X4Y2 \cdot x^4 y^2 + X2Y4 \cdot x^2 y^4 + X0Y6 \cdot y^6 + \ldots$$

Herein, if a direction of a normal line of an anamorphic and aspherical surface at a center (surface apex) of the anamorphic and aspherical surface is a Z-direction in the above-described formula;

x is a coordinate in a first direction orthogonal to Z-direction;

y is a coordinate in a second direction orthogonal to both Z-direction and the first direction;

r is a height in a direction perpendicular to Z-direction ($r^2 = x^2 + y^2$);

Z (x, y) is a distance (sag amount) from a tangential plane of the anamorphic and aspherical surface at the center thereof to the anamorphic and aspherical surface at coordinates (x, y);

c is a curvature (or a reciprocal of a radius of curvature) of an anamorphic and aspherical surface at the center of the anamorphic and aspherical surface;

k is a conic constant of the anamorphic and aspherical surface at the center of the anamorphic and aspherical surface; and X4Y0, X2Y2, X0Y4, X5Y0, X3Y2, ... are coefficients of a term of $X^4$, term of $x^2y^2$, term of $y^4$, term of $x^5$, term of $x^3y^2$, ..., respectively.

In this case, it may be possible to provide an imaging optical system with a comparatively good resolution performance. That is, because the reflection surface having a positive power has a shape of an anamorphic and aspherical surface, a degree of freedom of a design of a reflection surface having a positive power may be increased whereby it may be possible to correct or reduce an aberration(s) of an imaging optical system better. As a result, it may be possible to provide an imaging optical system with a comparatively good resolution performance. In particular, it may be possible to correct or reduce a distortion and/or field curvature which may be frequently and significantly generated in a comparatively wide angle imaging optical system, whereby it may be possible to obtain a comparatively wide angle imaging optical system with a comparatively good resolution performance.

An imaging optical system according to the fifth illustrative embodiment of the present invention is preferably an imaging optical system characterized in that the image is shifted to a direction perpendicular to a direction of the optical axis of the lens system with respect to the optical axis of the lens system.

In this case, it may be possible to provide a more compact imaging optical system more easily. More particularly, when particularly a first optical system includes a reflection surface having a positive power and a second optical system includes a lens system having an optical axis and having a positive power, partial separation (avoidance of complete coincidence) between a light ray(s) entering from an object to a reflection surface having a positive power and a light ray(s) emitted from the reflection surface having a positive power to a lens system having a positive power may be required in order to avoid or reduce vignetting of a light ray(s) from the object to an image by the lens system having a positive power. For this purpose, it is considered that a reflection surface having a positive power is tilted and/or an image surface is shifted, with respect to an optical axis of a lens system having a positive power. Herein, because the image is shifted to a direction perpendicular to a direction of an optical axis of the lens system with respect to the optical axis of the lens system, it may be possible to partially separate between a light ray(s) entering from an object to a reflection surface having a positive power and a light ray(s) emitted from the reflection surface having a positive power to a lens system having a positive power more easily. Accordingly, it may be possible to arrange an optical element(s) constituting an imaging optical system such as a reflection surface having a positive power and/or a lens system having a positive power more easily. That is, it may be possible to provide an imaging optical system more easily in which a first optical system includes a reflection surface having a positive power and a second optical system includes a lens system having an optical axis and having a positive power.

An imaging optical system according to the fifth illustrative embodiment of the present invention is preferably an imaging optical system characterized in that a length of the reflection surface having a positive power in a first direction perpendicular to a direction of the optical axis of the lens system is a half or less of a length of the reflection surface having a positive power in a direction perpendicular to both the direction of the optical axis of the lens system and the first direction. A length of the reflection surface having a positive power in a first direction perpendicular to a direction of the optical axis of the lens system is more preferably one-fifth or less, and even more preferably one-tenth or less, of a length of the reflection surface having a positive power in a direction perpendicular to both the direction of the optical axis of the lens system and the first direction.

In this case, it may be possible to provide a more compact imaging optical system more easily. That is, because a length of the reflection surface having a positive power in a first direction perpendicular to a direction of the optical axis of the lens system is a half or less of a length of the reflection surface having a positive power in a direction perpendicular to both the direction of the optical axis of the lens system and the first direction, it may be possible to reduce a size of a reflection surface having a positive power whereby it may be possible to provide a more compact imaging optical system.

An imaging optical system according to the fifth illustrative embodiment of the present invention is preferably an imaging optical system characterized in that a length of the at least one reflection surface folding an optical path from the object to the image and having no power in a first direction perpendicular to a direction of the optical axis of the lens system is less than a length of the reflection surface having a positive power in the first direction.

In this case, it may be possible to provide a more compact imaging optical system more easily. That is, because a length of the at least one reflection surface folding an optical path from the object to the image and having no power in a first direction perpendicular to a direction of the optical axis of the lens system is less than a length of the reflection surface having a positive power in the first direction, it may be possible to reduce a size of at least one reflection surface having no power whereby it may be possible to provide a more compact imaging optical system.

Practical Example 1

FIG. 1A and FIG. 1B are diagrams illustrating one example of an imaging optical system in an image reading device according to one embodiment of the present invention. FIG. 1A is a diagram illustrating one example of an imaging optical system in an image reading device according to one embodiment of the present invention and FIG. 1B is a diagram illustrating one example of an imaging optical system in a conventional image reading device.

In one example of an imaging optical system 100 or 100' in an image reading device illustrated in FIG. 1A or FIG. 1B, an original copy surface 101 or 101' on an object surface, a reflection surface having a positive power 102 or 102', a lens system having a positive power 103 or 103', and an image-capturing device 104 or 104' on an image surface are arranged in order from an object side. Herein, a reflection surface having a positive power 102 or 102' is schematically drawn as a refractive lens in FIG. 1A or FIG. 1B, in order to avoid overlapping of light rays and illustrate imaging optical systems more simply. Furthermore, a lens system having a positive power 103 or 103' is schematically drawn as one lens but is not limited to a lens system composed of only one lens in the example of an imaging optical system 100 in an image reading device according to one embodiment of the present invention as illustrated in FIG. 1A and may be lens group composed of plural lenses.

In the example of an imaging optical system 100 in an image reading device according to one embodiment of the present invention as illustrated in FIG. 1A, light beams with an incidence angle emitted from respective points on the original copy surface 101 are once collected before entering the reflection surface having a positive power 102 and a convergent light beam refracted by the reflection surface having a positive power 102 are generally focused to form an intermediate image 105. That is, entrance pupils 106 of the imaging optical system 100 illustrated in FIG. 1A are present between the original copy surface 101 and the reflection surface having a positive power 102 and the principal rays of light beams emitted from the original copy surface 101 are intersected near the positions of the entrance pupils 106. Divergent light beams from the intermediate image 105 formed by the reflection surface having a positive power 102 are focused on an image-capturing device 104 by a lens system 103 having a positive power which is provided with an aperture stop, and a picture on the original copy surface is imaged on the image-capturing device 104. Herein, the reflection surface having a positive power 102 is allowed to have a large power, because an intermediate image 105 is formed between the reflection surface having a positive power 102 and the lens system having a positive power 103. As a result, the imaging optical system 100 illustrated in FIG. 1A is allowed to design as a wide angle optical system more easily. Furthermore, when the configuration of the lens system having a positive power 103 provided between the intermediate image 105 and the image-capturing device 104 is optimized so as to correct an aberration(s) generated by the reflection surface having a positive power 102, in particular, the distortion, field curvature, and astigmatism caused by increase of a field of view of the optical system, an aberration(s) of a final image surface, namely, an image surface on the image-capturing device 104 is/are corrected well. As a result, the resolution performance of the imaging optical system 100 is improved whereby it may be possible to obtain a wider angle imaging optical system 100.

On the other hand, in the example of the imaging optical system 100' in a conventional image reading device as illustrated in FIG. 1B, it is difficult for the reflection surface having a positive power 102' to have a large power, because no intermediate image is formed between the reflection surface having a positive power 102' and the lens system having a positive power 103'. As a result, it is difficult to obtain a wide angle imaging optical system 100'.

In an image reading device including the imaging optical system 100 in which the original copy surface 101 on the object surface, the reflection surface having a positive power 102, the lens system having a positive power 103, and the image-capturing device 104 are arranged in order from the object side as illustrated in FIG. 1A, the intermediate image 105 is formed between the reflection surface having a positive power 102 and the lens system having a positive power 103 whereby it may be possible to obtain an image reading device including the wide angle imaging optical system 100.

Practical Example 2

Figure 2:
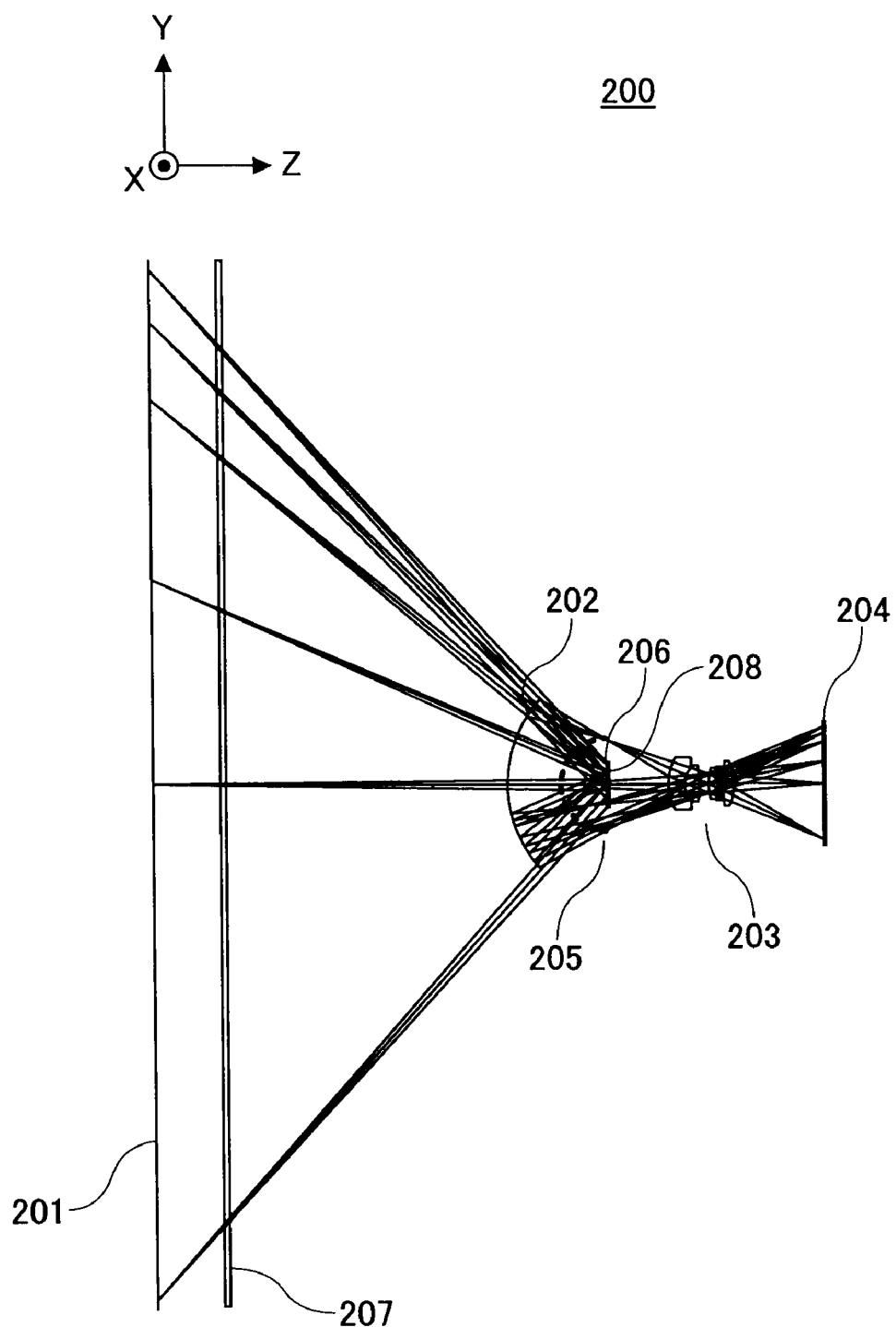
FIG. 2 is a diagram illustrating another example of an imaging optical system in an image reading device according to one embodiment of the present invention.

FIG. 2 is a diagram illustrating another example of an imaging optical system in an image reading device according to one embodiment of the present invention. More particularly, FIG. 2 illustrates an YZ cross section of an imaging optical system 200 wherein X-, Y-, and Z-directions are orthogonal to one another. Herein, Y-direction is a longitudinal direction of pixel arrangement of an image-capturing device 204 and also referred to as a main-scanning direction of an image reading device. Furthermore, Z-direction is a direction of the optical axis of a lens system having a positive power 203. That is, the optical axis of the lens system having a positive power 203 and the longitudinal direction of pixel arrangement of the image-capturing device 204 are orthogonal to each other.

Moreover, it may also be possible to use a one-dimensional image-capturing device having one-dimensionally provided pixels for the image-capturing device 204 in an image reading device according to one embodiment of the present invention. Alternatively, it may also be possible to use an image-capturing device in which three one-dimensional image-capturing devices are arranged in parallel, in order to read a color image, for example, in order to read three color signals such as red, green and blue ones, wherein the main-scanning direction of the image reading device is the direction of the one-dimensional pixel arrangement of the image-capturing devices.

The example of the imaging optical system 200 of an image reading device according to one embodiment of the present invention as illustrated in FIG. 2 is composed of an original copy surface 201 of an original copy disposed on an object surface, a contact glass 207, a planar mirror 208 for folding an optical path, a reflection surface having a positive power 202, the lens system having a positive power 203, and the image-capturing device 204 arranged on an image surface, in order from an object side along the optical path of the imaging optical system 200. Additionally, illumination means such as a lamp for irradiating the original copy surface 201 with light are frequently arranged which are not illustrated in FIG. 2. Light reflected from the original copy surface 201 illuminated by the illumination means or the like is incident on the planar mirror 208 arranged near an entrance pupils 206 through the contact glass 207. Herein, the optical path of light reflected from the original copy surface 201 is folded by the planar mirror 208 arranged near the entrance pupils 206. Then, a light beam with an optical path folded by the planar mirror 208 is incident on the reflection surface having a positive power 202 and a convergent light beam refracted by the reflection surface having a positive power 202 is generally focused so as to form an intermediate image 205. Herein, the principal rays of light of respective incident angles reflected from the original copy surface 201 are collected near the entrance pupils 206 of the imaging optical system 200. Therefore, when the planar mirror 208 is arranged near the positions of the entrance pupils 206 of the imaging optical system 200, the length of the planar mirror 208 in Y-direction is less than the length of the reflection surface having a positive power 202 as an optical element having a power arranged closest to the object side in Y-direction, whereby it may be possible to reduce the surface area of the planar mirror 208. Then, a divergent light beam from the intermediate image 205 formed by the reflection surface having a positive power 202 is focused on the image-capturing device 204 by the lens system having a positive power 203 provided with an aperture stop and a picture on the original copy surface is imaged on the image-capturing device 204.

Herein, the image surface of the intermediate image 205 is curved, whereby it may be possible to reduce, correct, or compensate for a field curvature generated by the reflection surface having a positive power 202 with a field curvature of the lens system having a positive power 203. In particular, if the image surface of the intermediate image 205 is curved so as to get closer to the lens system 203 with increasing the distance from the optical axis of the lens system having a positive power 203, it may be possible to reduce, correct, or compensate for a field curvature generated by the reflection surface having a positive power 202 with a field curvature of the lens system having a positive power 203 when the field of view of the imaging optical system 200 is increased by increasing the power of the reflection surface having a positive power 202. As a result, it may be possible to further increase the field of view of the imaging optical system 200.

Furthermore, when the reflection surface having a positive power 202 is an axially symmetric aspherical surface, it may be possible to increase the degree of freedom of design of the reflection surface having a positive power 202 whereby it may be possible to improve the resolution performance of the imaging optical system. Moreover, when the reflection surface having a positive power 202 has a shape of anamorphic and free-form surface, it may be possible to further increase the degree of freedom of design of the reflection surface having a positive power. As a result, it may be possible to obtain the imaging optical system with a high resolution performance. Furthermore, it may be possible to further increase the field of view of the imaging optical system 200 while maintaining the resolution performance of the imaging optical system 200, because the capability of aberration correction of an anamorphic and free-form surface is high.

Practical Example 3

Figure 3:
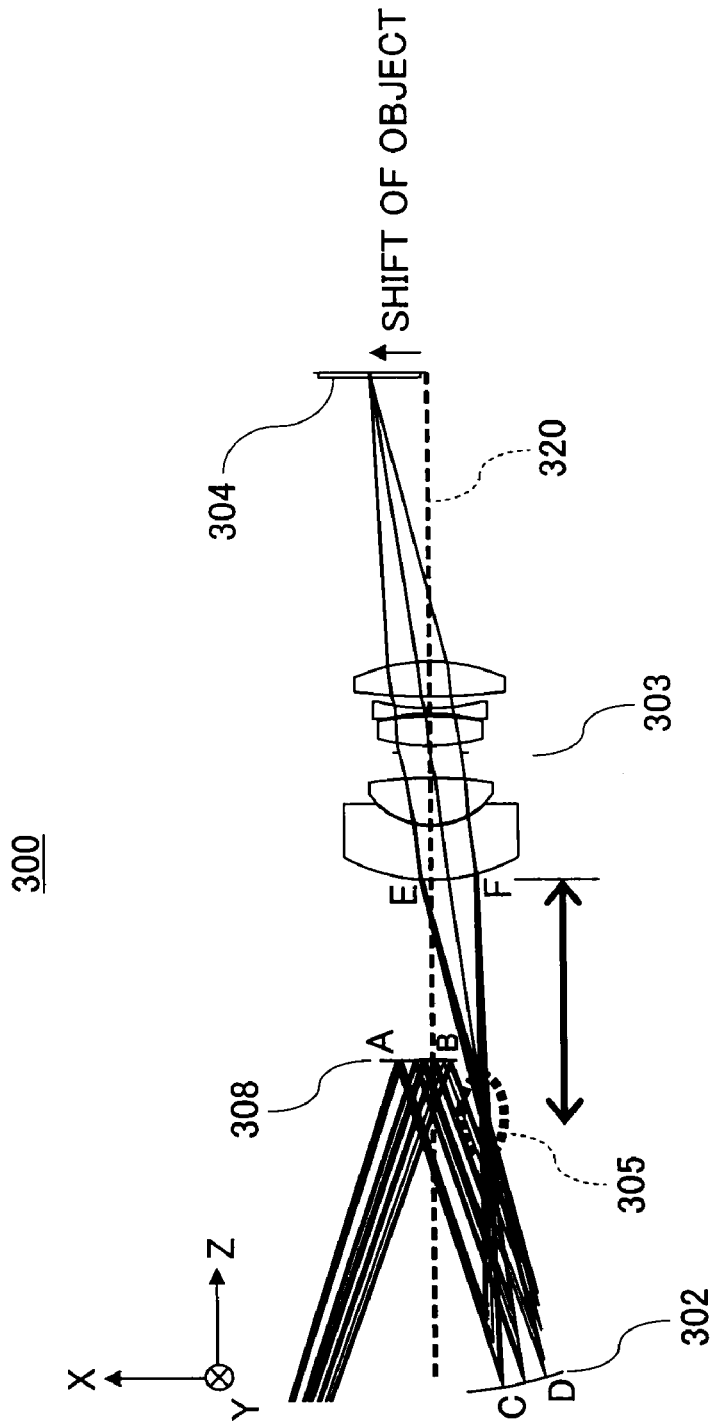
FIG. 3 is a diagram illustrating another example of an imaging optical system in an image reading device according to one embodiment of the present invention.

FIG. 3 is a diagram illustrating another example of an imaging optical system in an image reading device according to one embodiment of the present invention. More particularly, FIG. 3 illustrates an XZ cross section of an imaging optical system 300 wherein X-, Y-, and Z-directions are orthogonal to one another. Herein, Y-direction and Z-direction are similar to those in practical example 2. Furthermore, FIG. 3 is also a side view of the imaging optical system 200 illustrated in FIG. 2.

Similarly to those illustrated in FIG. 3, an imaging optical system 300 is composed of the original copy surface of an original copy disposed on an object surface (which is not illustrated in the figure), a contact glass (which is not illustrated in the figure), a planar mirror 308 closest to a reflection surface having a positive power 302, the reflection surface having a positive power 302, a lens system having a positive power 303, and an image-capturing device 304 arranged on an image surface, in order from an object side. In the imaging optical system 300 illustrated in FIG. 3, the planar mirror 308 for folding an optical path is arranged in the optical path from the original copy surface of an original copy to the reflection surface having a power 302 whereby the size of the imaging optical system 300 is reduced by folding the optical path.

In FIG. 3, "A" indicates a point at which the top light ray in X-direction for a light beam emitted from one point on the original copy surface impinges on the planar mirror 308 closest to the reflection surface having a positive power 302 and "B" indicates a point at which the bottom light ray in X-direction for a light beam emitted from one point on the original copy surface impinges on the planar mirror 308 closest to the reflection surface having a positive power 302. Furthermore, "C" indicates a point at which the top light ray in X-direction impinges on the reflection surface having a positive power 302 and "D" indicates a point at which the bottom light ray in X-direction impinges on the reflection surface having a positive power 302. Moreover, "E" indicates a point at which the bottom light ray in X-direction impinges on a first surface of the lens system having a positive power 303 and "F" indicates a point at which the top light ray in X-direction impinges on the first surface of the lens system having a positive power 303.

As illustrated in FIG. 3, the top light ray in X-direction for a light beam emitted from one point on the original copy surface passes along path ACF and the bottom light ray in X-direction for a light beam emitted from one point on the original copy surface passes along path BDE. Furthermore, a point of intersection of line CF with line DE is generally a position of the intermediate image 305.

Herein, for example, if the planar mirror 308 is arranged between the reflection surface having a positive power 302 and the intermediate image 305 with respect to the optical axis 320 of the lens system having a positive power 303 while the angle between light ray BD and light ray DE is maintained, the planar mirror 308 may intersect light ray CF and the like and vignetting of light ray CF and the like by the planar mirror 308 may be caused.

On the other hand, if the planar mirror 308 is arranged between the lens system having a positive power 303 and the image-capturing device 304 with respect to the direction of the optical axis 320 of the lens system having a positive power 303, light ray BD and the like emitted from the planar mirror 308 may intersect a lens(es) constituting the lens system having a positive power 303 and vignetting of light ray BD and the like by the lens(es) constituting the lens system having a positive power 303 may be caused.

In order to avoid the vignetting of light ray CF and the like or light ray BD and the like, it is considered that the angle between light ray BD and light ray DE is increased, that is, the inclination angle of the reflection surface having a positive power 302 with respect to the direction of the optical axis 320 of the lens system having a positive power 303 is increased. In this case, the location of the image-capturing device 304 is shifted upward on an image surface in X-direction and a shift of an image on the image-capturing device 304 with respect to the optical axis 320 is increased. Herein, if a shift of an image on the image-capturing device 304 is increased, the aberration(s) of the imaging optical system 300 is commonly increased and the resolution performance of the imaging optical system 300 tends to degrade. Therefore, it may be required that the capability of aberration correction of an optical element such as the reflection surface 302 and the lens system 303 be improved, and for example, the number of lenses constituting the lens system 303 may be increased or an asphercial surface may be employed for the lens system 303. As a result, the cost of the imaging optical system 300 may be increased and assembly of the lens system 303 in the imaging optical system 300 may be more complex.

Therefore, in the imaging optical system 300 illustrated in FIG. 3, while the angle between light ray BD and light ray DE is maintained at as a small angle as possible, the planar mirror 308 is present between the intermediate image 305 and the lens system having a positive power 303 with respect to the direction of the optical axis 320 of the lens system having a positive power 303 as indicated by an arrow in FIG. 3 such that light ray CF and the like do not intersect the planar mirror 108 or light ray BD and the like do not intersect a lens constituting the lens system having a positive power 303. When the planar mirror 308 is arranged between the intermediate image 305 and the lens system having a positive power 303, it may be possible to maintain the angle between light ray BD and light ray DE at a small angle, and therefore, it may be possible to reduce a shift of the image-capturing device 304 with respect to the optical axis 320 of the lens system 303. As a result, it may be possible to provide the imaging optical system 300 with a reduced aberration(s) and a higher resolution performance.

Practical Example 4

Figure 4:
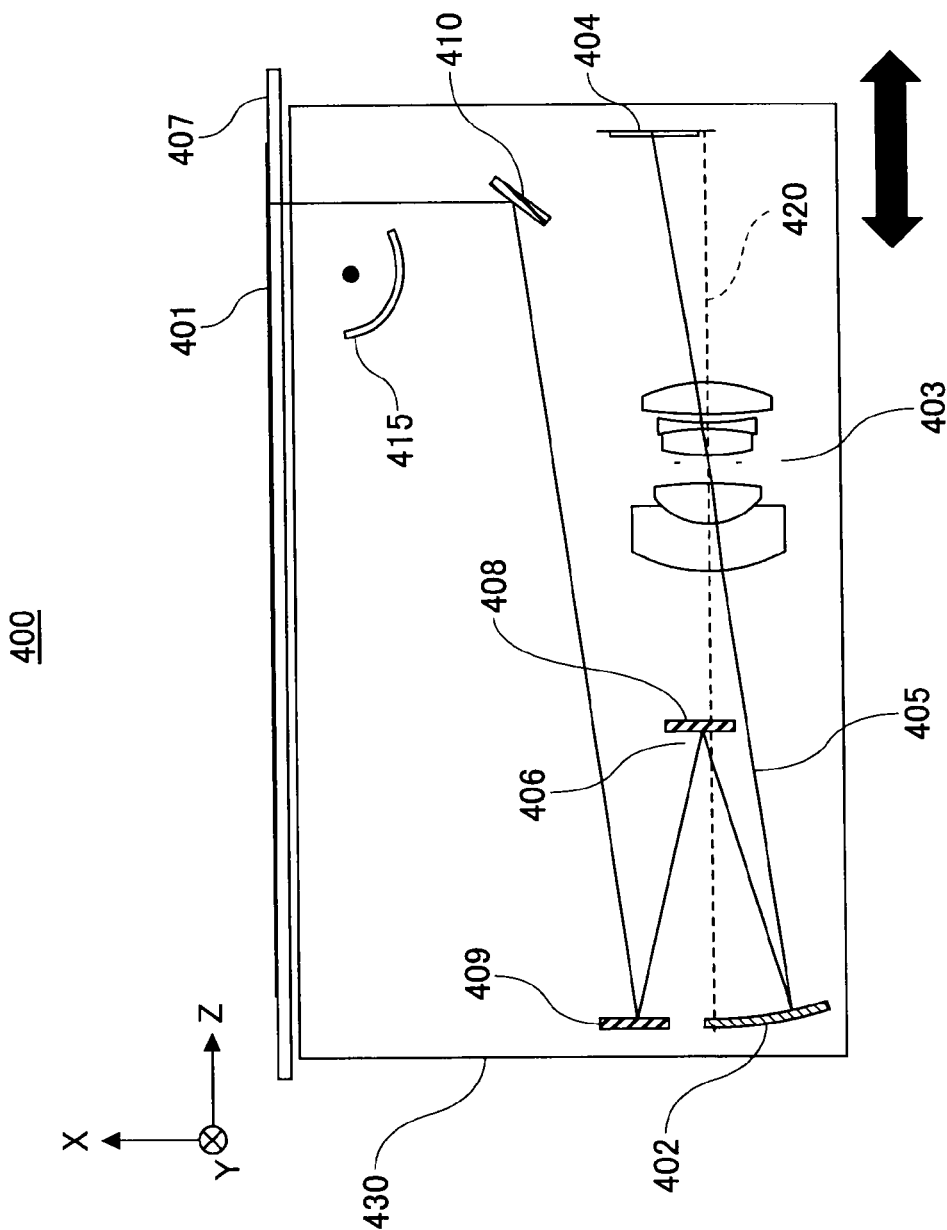
FIG. 4 is a diagram illustrating one example of an image reading device according to one embodiment of the present invention.

FIG. 4 is a diagram illustrating one example of an image reading device according to one embodiment of the present invention. More particularly, FIG. 4 illustrates an XZ cross section of an image reading device 400 wherein X-, Y-, and Z-directions are orthogonal to one another. Herein, X-direction is a direction perpendicular to the original copy surface 401 of an original copy whose picture is read, and the direction of the height of the image reading device 400 in FIG. 4. Furthermore, Z-direction is a direction in which a movable body of the image reading device 400 moves when a picture on the original copy surface 401 of an original copy is read, is also referred to as a sub-scanning direction of the image reading device 400, and is the same direction as the direction of the optical axis 420 of a lens system having a positive power 403 constituting an imaging optical system included in the image reading device in FIG. 4. Y-direction is the longitudinal direction of pixel arrangement of an image-capturing device 404 and is also referred to as a main-scanning direction of the image reading device.

Furthermore, it may also be possible to use a one-dimensional image-capturing device having one-dimensionally provided pixels for the image-capturing device 404 in the image reading device 400 illustrated in FIG. 4, similarly to practical example 2. Alternatively, it may also be possible to use an image-capturing device in which three one-dimensional image-capturing devices are arranged in parallel, in order to read a color image, for example, in order to read three color signals such as red, green and blue ones, wherein the main-scanning direction of the image reading device 400 is the direction of the one-dimensional pixel arrangement of the image-capturing devices.

In the image reading device 400 illustrated in FIG. 4, while the original copy surface 401 of an original copy placed on a contact glass 407 is illuminated by illumination means 415, the optical path of light reflected from the original copy surface of the original copy is folded by plural planar mirrors 409 and 410 and the light reflected from the original copy surface 401 is incident on a planar mirror 408 closest to a reflection surface having a positive power 402 arranged near entrance pupils 406 of an imaging optical system. Then, light reflected from the planar mirror 408 is reflected by the reflection surface having a positive power 402 and light beams with an incidence angle reflected from the reflection surface having a positive power 402 are generally focused so as to form an intermediate image 405. Then, a divergent light beam from the intermediate image 405 is converged on the image-capturing device 404 by the lens system having a positive power 403 so as to form an image.

Herein, the image-capturing device 404 is shifted to the direction in which it gets closer to the original copy surface 401 in X-direction, with respect to the optical axis 420 of the lens system having a positive power 403. Accordingly, the position at which a light ray impinges on the reflection surface having a positive power 402 is shifted to the direction in which it moves away from the original copy surface 401 in X-direction, with respect to the optical axis 420 of the lens system 403. As a result, it may be easier to separate a light ray(s) entering the reflection surface having a positive power 402 from a light ray(s) exiting from the reflection surface having a positive power 402. furthermore, because it may be possible to separate a light ray(s) entering the reflection surface having a positive power 402 from a light ray(s) exiting from the reflection surface having a positive power 402, interference of a light ray(s) exiting from the reflection surface having a positive power 402 by the planar mirror 408 closest to the reflection mirror having a positive power 402 may be difficult to occur and the configuration of an imaging optical system may be simpler.

In addition, when the intermediate image 405 is formed near entrance pupils 406 of light beams entering the reflection surface having a positive power 402 in a direction perpendicular to the optical axis 420 of the lens system 403, the light beams entering the reflection surface having a positive power 402 is thinned near the intermediate image 405. Therefore, interference of a light ray(s) by the planar mirror 408 closest to the reflection surface having a positive power 402 arranged near the entrance pupils 406 may be avoided more easily and it may be possible to reduce a shift of the position at which a light ray impinges on the reflection surface having a positive power 402.

Furthermore, because the intermediate image 406 is formed whereby it may be possible to provide a wide angle imaging optical system as described above, it may be possible to reduce an object-to-image distance for an imaging optical system, in particular, to reduce the optical path from the original copy surface 401 to the reflection surface having a positive power 402. Therefore, when the size of a housing 430 of the image reading device 400 is constant, it may be possible to reduce the number of folds of the optical path which are conducted by the planar mirrors 408, 409, and 410. Accordingly, it may be possible to reduce the number of the planar mirrors 408, 409, and 410 installed in the image reading device 400 and cost reduction of the image reading device 400 may be attained. Similarly, because it may be possible to reduce the optical path length of an imaging optical system included in the image reading device 400, it may be possible to reduce the size of the housing 430 of the image reading device 400, in particular, the height of the image reading device 400 in X-direction of FIG. 4, and miniaturization of the device may be attained.

Figure 5:
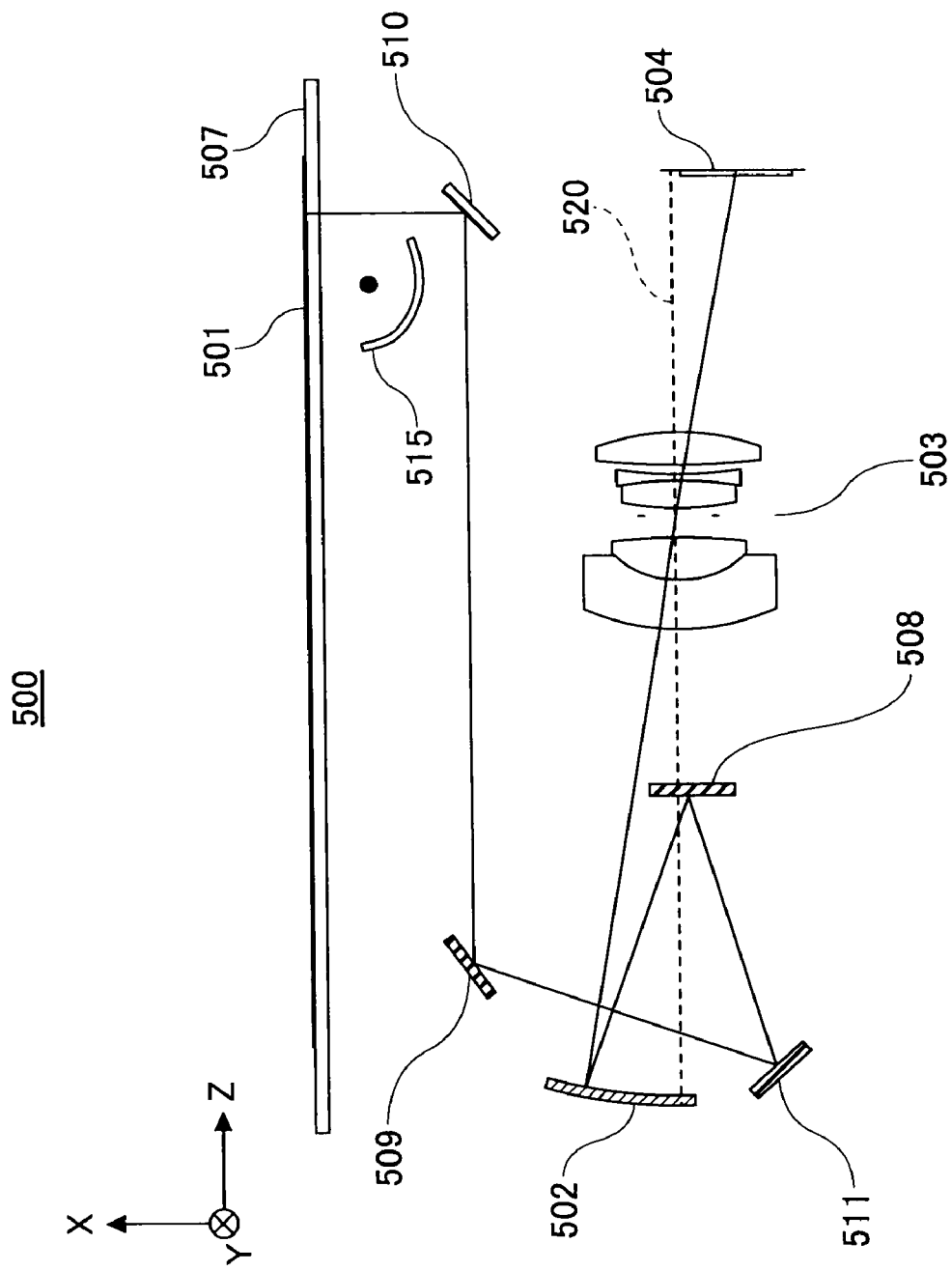
FIG. 5 is a diagram illustrating another example of an image reading device according to one embodiment of the present invention.

FIG. 5 illustrates a diagram illustrating another example of an image reading device according to one illustrative embodiment of the present invention.

Herein, a coordinate system in FIG. 5 is identical to the coordinate system in FIG. 4. Furthermore, an original copy surface 501, a reflection surface having a positive power 502, a lens system having a positive power 503 and an optical axis thereof 520, an image-capturing device 504, a contact glass 507, planar mirrors 508, 509, 510, and 511, and illumination means 515 in an image reading device 500 illustrated in FIG. 5 are similar to those of the image reading device 400 illustrated in FIG. 4. In the image reading device 500 illustrated in FIG. 5, the manner of folding a light ray(s) exiting from the original copy surface 501 is different from the manner of folding a light ray(s) in FIG. 4. More particularly, the arrangement of the reflection surface having a positive power 502 and the image-capturing device 504 with respect to the optical axis 520 of the lens system having a positive power 503 as illustrated in FIG. 5 is opposite to the arrangement illustrated in FIG. 4. In the image reading device 500 illustrated in FIG. 5, the planar mirror 511 for folding the optical path of the imaging optical system is arranged at a position at which the distance from the original copy surface in X-direction is larger, with respect to the reflection surface having a positive power 502, and an optical path from the original copy surface 501 to the reflection surface having a positive power 502 is formed in the space between the reflection surface having a positive power 502 and the lens system having a positive power 503. In this case, it may be possible to utilize the space between the reflection surface having a positive power 502 and the lens system having a positive power 503 effectively, and it may be possible to reduce the total height of the image reading device 500 illustrated in FIG. 5.

Additionally, although the number of planar mirrors for folding the optical path of the imaging optical system is 3 for the image reading device 400 illustrated in FIGS. 4 and 4 for the image reading device 500 illustrated in FIG. 5, the number of a planar mirror(s) included in an imaging optical system in an image reading device according to one illustrative embodiment of the present invention is not limited. Furthermore, the direction of folding of the optical path of an imaging optical system, which is conducted by a planar mirror, and the like are also not limited.

Moreover, when reading a picture on the original copy 401 or 501 in the image reading device 400 illustrated in FIG. 4 and the image reading device 500 illustrated in FIG. 5, the entire of the housing 430 of the image reading device 400 as illustrated in FIG. 4 or the entire of a housing of the image reading device 500 as illustrated in FIG. 5 move in Z-direction while its height with respect to the original copy surface 401 or 501 is maintained. Then, the entire of the housing 430 of the image reading device 400 or the entire of the housing of the image reading device 500 as illustrated in FIG. 5 scans a picture on the original copy surface 401 or 501, the picture is read by the image-capturing device 404 or 504 so as to form information of a two-dimensional image. Alternatively, the original copy per se is moved to Z-direction by using a paper feed device and the like, whereby it may also be possible to obtain information of a two-dimensional image.

Figure 6:
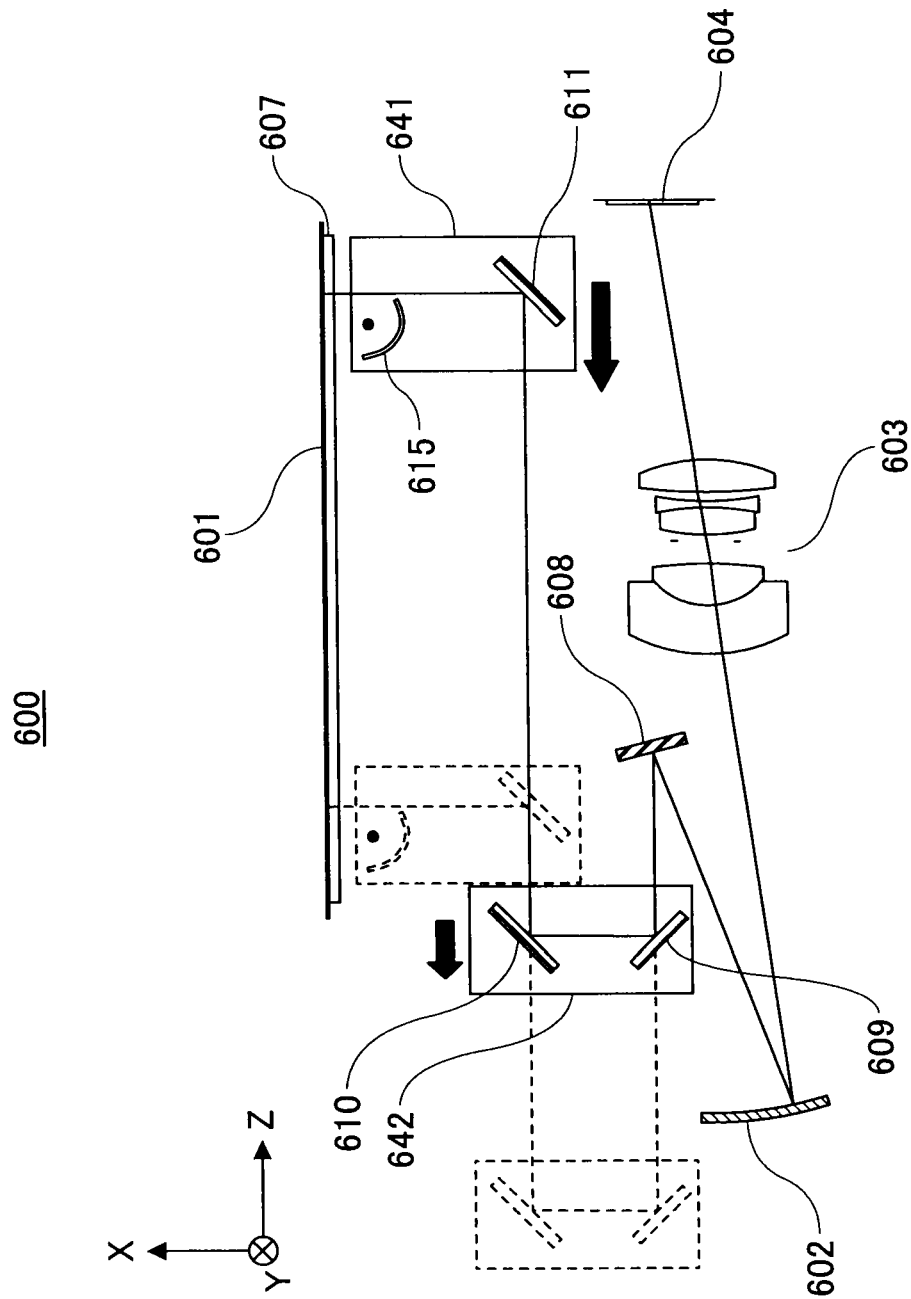
FIG. 6 is a diagram illustrating another example of an image reading device according to one embodiment of the present invention.

FIG. 6 is a diagram illustrating another example of an image reading device according to one illustrative embodiment of the present invention.

Herein, a coordinate system in FIG. 6 is identical to the coordinate systems in FIG. 4 and FIG. 5. Furthermore, an original copy surface 601, a reflection surface having a positive power 602, a lens system having a positive power 603, an image-capturing device 604, a contact glass 607, planar mirrors 608, 609, 610, and 611, and illumination means 615 in an image reading device 600 illustrated in FIG. 6 are similar to those in the image reading device 400 illustrated in FIG. 4 and image reading device 500 illustrated in FIG. 5.

Moreover, an image reading device 600 illustrated in FIG. 6 includes a first movable body 641 including illumination means 615 and a planar mirror 611 for folding the optical path of an imaging optical system and a second movable body 642 including a planar mirror 609 and a planar mirror 610 in an image reading device 600 illustrated in FIG. 6. Herein, the planar mirror 609 and the planar mirror 610 are installed in the second movable body 642 such that those reflection surfaces are orthogonal to each other. The planar mirror 611 installed in the first movable body 642 is arranged such that light reflected from the original copy surface 601 is reflected to the planar mirror 610 installed in the second movable body 642 (to −Z-direction) in parallel to the original copy surface 601 and to the planar mirror 608 (to +Z-direction) in parallel to the original copy surface 601 by the planar mirror 610 and the planar mirror 609. In the image reading device 600, the entire of a housing of the image reading device 600 does not move while the first movable body 641 moves to Z-direction in parallel to the original copy surface 601 and the second movable body 642 moves in parallel to the original copy surface 601 at a half of the velocity of the first movable body 641. Then, the distance from the original copy surface 601 to the image-capturing device 604 is always kept at a constant value, and due to such movement of the first movable body 641 and second movable body 642, it may be possible to obtain information of a two-dimensional image on the original copy surface 601.

Practical Example 5

Numerical Value Practical Example 1

Next, one design example of an imaging optical system in an image reading device according to one illustrative embodiment of the present invention will be described as a numerical value practical example 1 below.

Table 1 indicates surface numbers, radii of curvature, surface separations, refractive indices, and Abbe numbers of optical elements and the like which constitute an imaging optical system of numerical value practical example 1.

TABLE 1

|  | Surface Number | Radius of Curvature | Surface Separation | Refractive Index | Abbe Number | Reflection Surface | Decentering |
|---|---|---|---|---|---|---|---|
|  | Object | 0.000 | 20.779 |  |  |  |  |
| CG | 1 | 0.000 | 1.974 | 1.51678 | 64.2 |  |  |
|  | 2 | 0.000 | 112.721 |  |  |  |  |
| Plane M | 3 | 0.000 | −30.000 |  |  | ○ | ○ |
| Concave M | 4 | 34.651 | 46.495 |  |  | ○ | ○ |
| L1 | 5 | 15.863 | 4.949 | 1.74663 | 39.0 |  |  |
|  | 6 | 6.972 | 0.100 |  |  |  |  |
| L2 | 7 | 6.899 | 4.299 | 1.48749 | 70.4 |  |  |
|  | 8 | −37.532 | 2.274 |  |  |  |  |
| Stop | 9 | 0.000 | 0.655 |  |  |  |  |
| L3 | 10 | 17.344 | 2.696 | 1.71798 | 47.0 |  |  |
|  | 11 | −25.779 | 0.250 |  |  |  |  |
| L4 | 12 | −18.034 | 0.500 | 1.68968 | 34.6 |  |  |
|  | 13 | 18.718 | 1.075 |  |  |  |  |
| L5 | 14 | 53.874 | 3.202 | 1.64307 | 56.2 |  |  |
|  | 15 | −16.609 | 25.000 |  |  |  |  |

TABLE 1-continued

| | Surface Number | Radius of Curvature | Surface Separation | Refractive Index | Abbe Number | Reflection Surface | Decentering |
|---|---|---|---|---|---|---|---|
| CG | 16 | 0.000 | 0.470 | 1.51678 | 64.2 | | |
| | 17 | 0.000 | 1.000 | | | | |
| | Image | 0.000 | 0.000 | | | | |

Herein, the refractive indices indicated in Table 1 are their values for d-line (587.56 nm).

Furthermore, reflection surfaces are indicated by "○" marks in Table 1. Reflection surfaces in the imaging optical system of numerical value practical example 1 are the third surface and the fourth surface. The number of a planar mirror for folding the optical path of the imaging optical system, which is used in the imaging optical system of numerical value practical example 1, is only one and the third surface is a planar mirror for folding the optical path of the imaging optical system.

The fourth surface is a reflection surface having a positive power and an anamorphic and free-form surface herein.

The shape of the anamorphic and free-form surface which is the fourth surface in the imaging optical system of numerical value practical example 1 is represented by the formula:

$$Z(x,y) = c \cdot r^2 / [1 + \{1 - (1+k)c^2 r^2\}^{1/2}] + X4Y0 \cdot x^4 + X2Y2 \cdot x^2 y^2 + X0Y4 \cdot y^4 + X5Y0 \cdot x^5 + X3Y2 \cdot x^3 y^2 + X1Y4 \cdot x^1 y^4 + X6Y0 \cdot x^6 + X4Y2 \cdot x^4 y^2 + X2Y4 \cdot x^2 y^4 + X0Y6 \cdot y^6 + \ldots$$

Additionally, when the direction of the normal of the anamorphic and free-form surface at the center (surface apex) of the anamorphic and free-form surface is Z-direction in the above-described formula, x is a coordinate in a first direction orthogonal to Z-direction, y is a coordinate in a second direction orthogonal to both Z-direction and the first direction, r is a height in direction perpendicular to Z-direction ($r^2 = x^2 + y^2$), Z(x, y) is the distance from a tangential plane of the anamorphic and aspherical surface at the center thereof to the anamorphic and aspherical surface at coordinates (x, y) (sag amount), c is the curvature (or the reciprocal of the radius of curvature) of the anamorphic and aspherical surface at the center of the anamorphic and aspherical surface, k is the conic constant of the anamorphic and aspherical surface at the center of the anamorphic and aspherical surface, X4Y0, X2Y2, X0Y4, X5Y0, X3Y2, ... are the coefficients of its $x^4$ term, $x^2 y^2$ term, $y^4$ term, $x^5$ term, $x^3 y^2$ term, ..., respectively Table 2 indicates the data of the anamorphic and aspherical surface, which is the fourth surface in the imaging optical system of numerical value practical example 1.

TABLE 2

| 1/c | 34.651 |
|---|---|
| k | 0 |
| X4Y0 | 6.73E-05 |
| X2Y2 | -2.09E-05 |

TABLE 2-continued

| X0Y4 | -1.55E-06 |
|---|---|
| X5Y0 | 4.62E-05 |
| X3Y2 | -4.47E-06 |
| X1Y4 | 9.34E-08 |
| X6Y0 | 8.28E-06 |
| X4Y2 | -5.95E-07 |
| X2Y4 | 3.21E-08 |
| X0Y6 | -1.71E-09 |
| X7Y0 | -6.12E-07 |
| X5Y2 | -3.62E-08 |
| X3Y4 | 4.08E-09 |
| X1Y6 | -1.30E-10 |
| X8Y0 | -4.04E-07 |
| X6Y2 | 2.29E-09 |
| X4Y4 | -4.19E-10 |
| X2Y6 | -4.27E-11 |
| X0Y8 | 1.24E-12 |
| X9Y0 | -5.15E-08 |
| X7Y2 | 7.02E-10 |
| X5Y4 | -1.16E-10 |
| X3Y6 | -7.20E-12 |
| X1Y8 | 3.27E-14 |
| X10Y0 | -2.22E-09 |
| X8Y2 | 4.36E-11 |
| X6Y4 | -6.13E-12 |
| X4Y6 | -4.44E-13 |
| X2Y8 | -4.98E-15 |
| X0Y10 | -1.92E-15 |

Additionally, decentering is also indicated by "○" marks in Table 1. The third surface and the fourth surface are decentered in the imaging optical system of numerical value practical example 1.

Table 3 indicates the data of the amount of decentering of the third surface and fourth surface in the imaging optical system of numerical value practical example 1.

TABLE 3

| | Surface Number 3 |
|---|---|
| X directional Shift (mm) | 0.000 |
| XZ in-plane rotation (°) | -19.01 |

| | Surface Number 4 |
|---|---|
| X directional Shift (mm) | -3.866 |
| X' Z' in-plane rotation (°) | -6.36 |

FIG. 7 is a diagram illustrating the configuration of the imaging optical system of numerical value practical example 1 in an image reading device according to one illustrative embodiment of the present invention. More particularly, FIG. 7 is a cross-section diagram of the imaging optical system of numerical value practical example 1 in XZ plane illustrated in FIG. 7. As illustrated in FIG. 7, the data behind the third surface which are provided in Table 1 are expressed by a new X'Z' coordinate system obtained by means of rotation by the amount of decentering of the third surface, -19.01°, indicated in Table 3, in XZ-plane around Y-direction indicated in FIG. 7. Furthermore, the decentering of the fourth surface is its decentering in a local coordinate system which operates on only the fourth surface and the coordinate system for surfaces behind the fourth surface is not influenced by the decentering of the fourth surface.

Figure 8B:
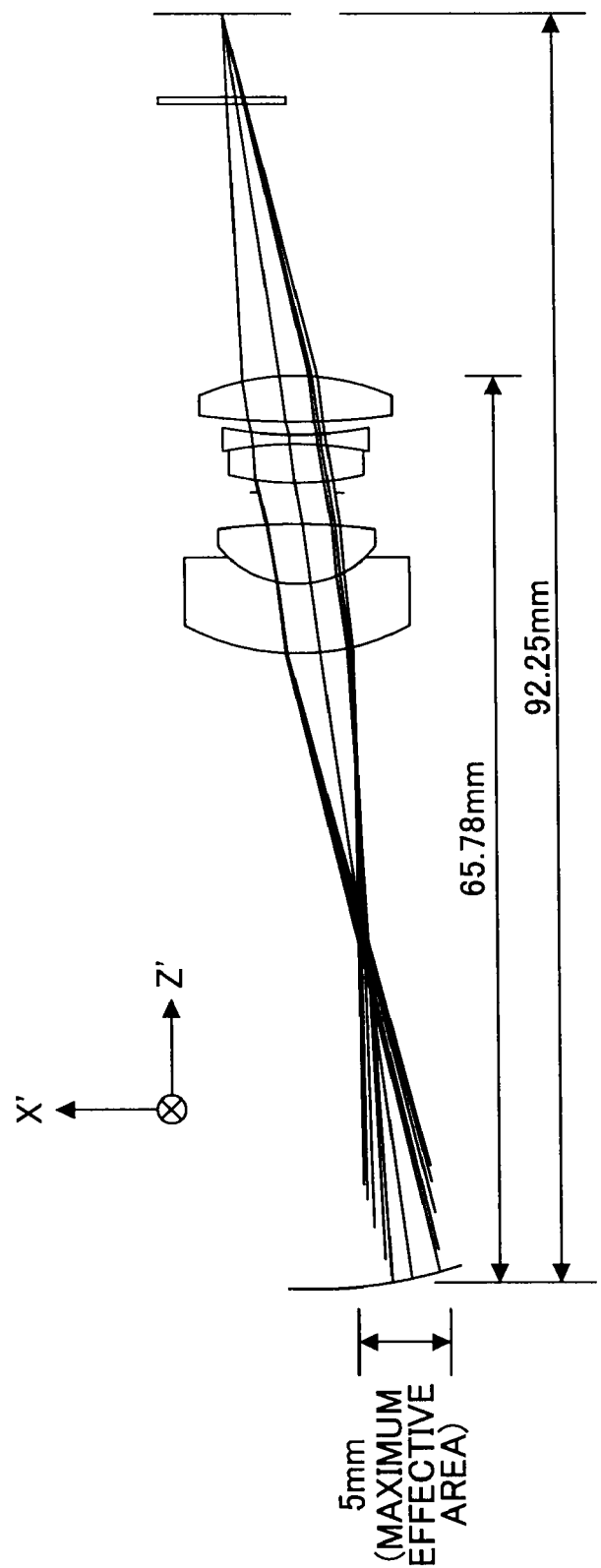
Figure 9A:
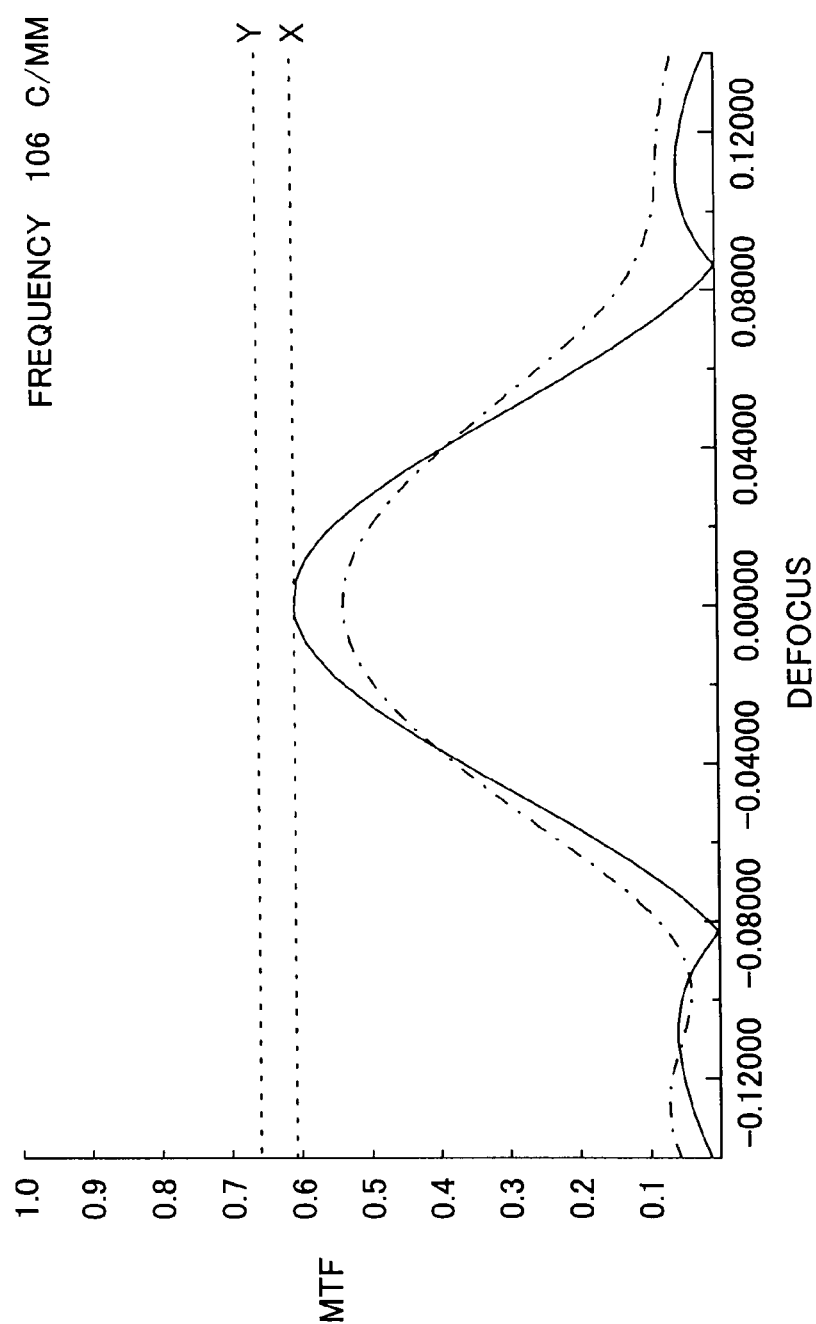
Figure 9B:
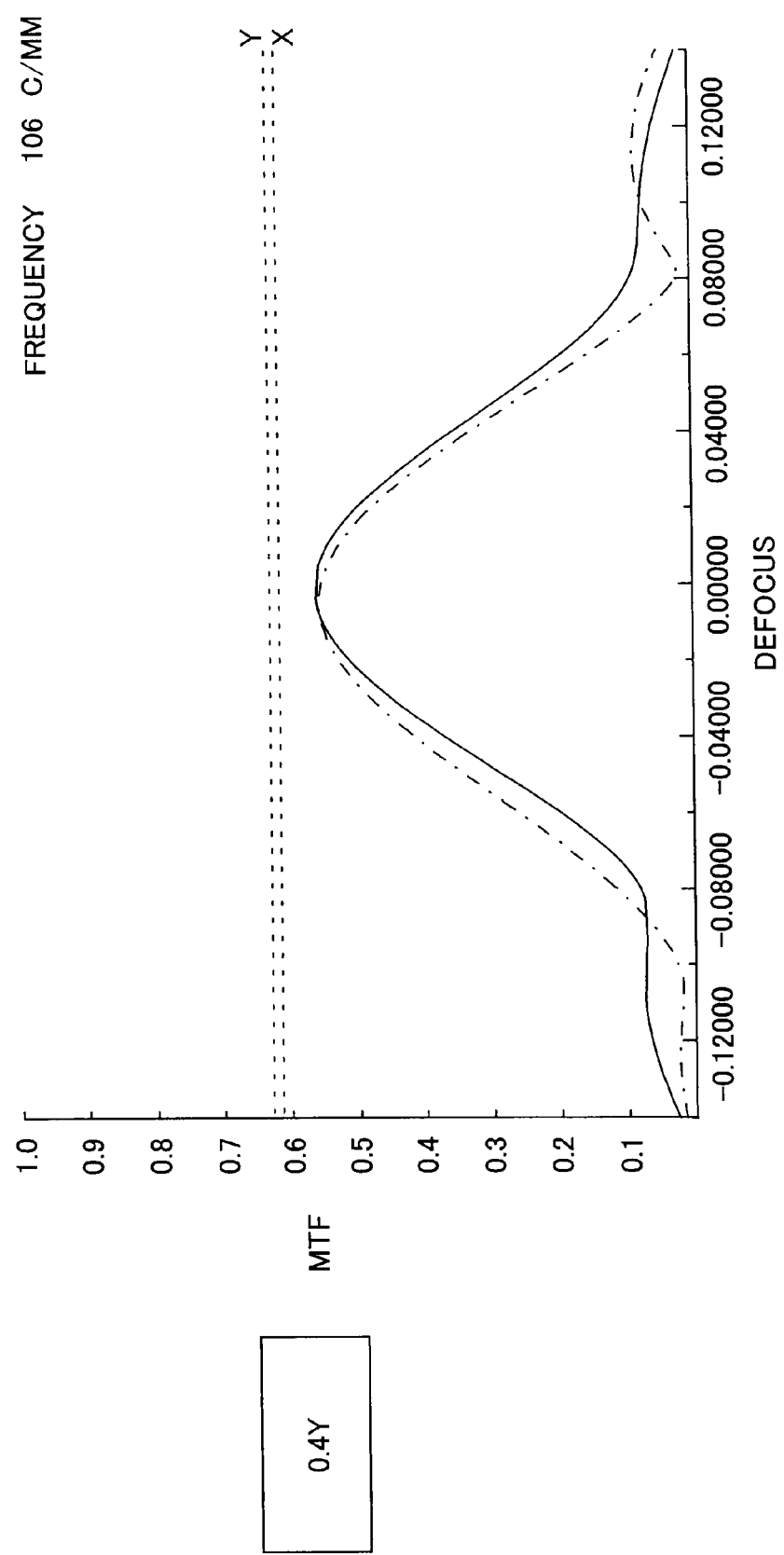
Figure 9D:
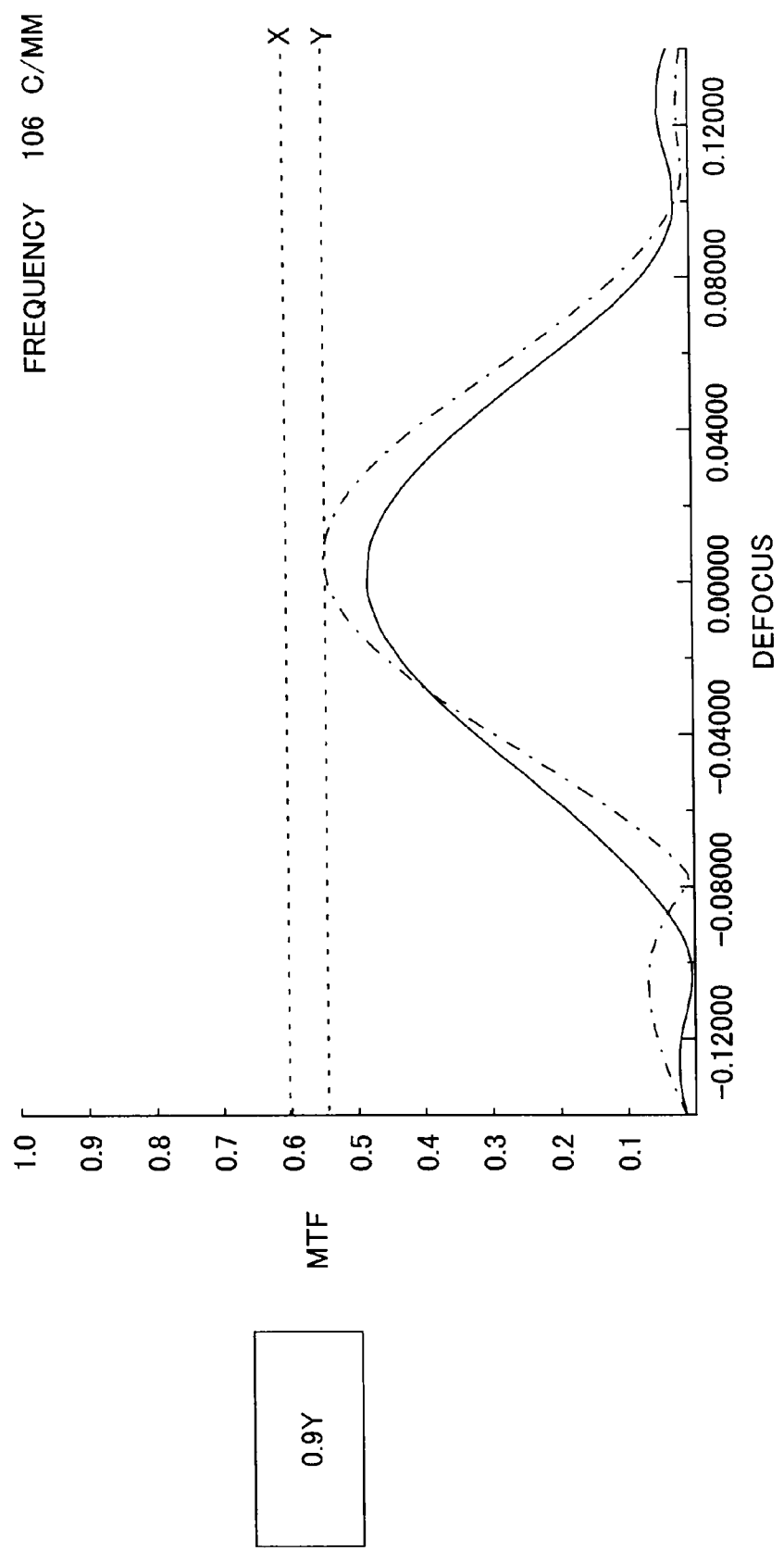
Figure 9E:
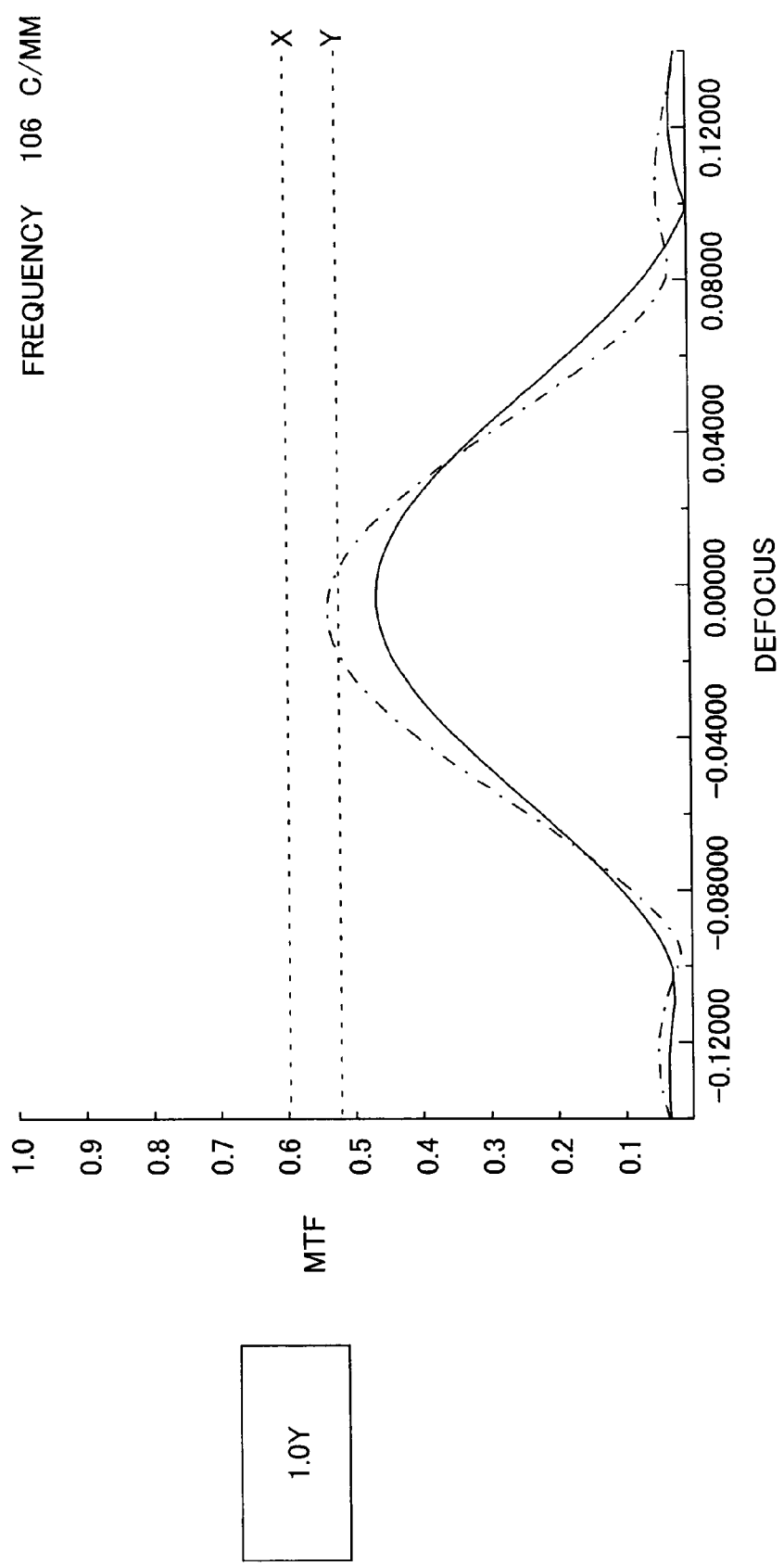

FIG. 8A and FIG. 8B are enlarged views of a reflection surface having a positive power and a lens system having a positive power in the imaging optical system of numerical value practical example 1. FIG. 8A is a cross-section diagram of the reflection surface having a positive power and lens system having a positive power included in the imaging optical system of numerical value practical example 1 in YZ'-plane and FIG. 8B is a cross-section diagram of the reflection surface having a positive power and lens system having a positive power included in the imaging optical system of numerical value practical example 1 in X'Z'-plane.

The imaging optical system of numerical value practical example 1 is a reading optical system for an image reading device with a reading density of 600 dpi which reduces and images the original copy surface of an original copy with a size if A3 on an one-dimensional image-capturing device with a pixel pitch of 4.7 μm, and the reduction ratio "m" of the imaging optical system of numerical value practical example 1 is 0.11102. Also, the brightness of the imaging optical system of numerical value practical example 1 is Fno=5.0 which provides a sufficiently bright imaging optical system as a reading optical system for image reading device. Furthermore, the half angle of view of the imaging optical system of numerical value practical example 1 is 46.8° and the imaging optical system of numerical value practical example 1 which uses a reflection surface having a positive power and an intermediate image is a wide angle optical system. Moreover, although the imaging optical system of numerical value practical example 1 is a wide angle optical system, the object-to-image distance from an object to an image for the imaging optical system of numerical value practical example 1 is 265.8 mm which is very short as compared to the object-to-image distance for a reading optical system for conventional image reading device. Furthermore, all the lenses included in the imaging optical system of numerical value practical example 1 (and constituting a lens system having a positive power) are spherical lenses and the number of the lenses included in the imaging optical system of numerical value practical example 1 is 5 wherein the number of lenses is, for example, less than the number of lenses in a reading optical system composed of only lenses. Moreover, the effective area of the reflection surface having a positive power is rectangular as the arrangement of pixels of a one-dimensional image-capturing device is taken into consideration. More particularly, the length of the effective area of the reflection surface having a positive power in the longitudinal direction thereof which corresponds to the direction of arrangement of pixels of a one-dimensional image-capturing device is 50 mm and the length of the (maximum) effective area of the reflection surface having a positive power in the lateral direction thereof which corresponds to the direction perpendicular to the direction of arrangement of pixels of the one-dimensional image-capturing device (and the optical axis of a lens system having a positive power) is 5 mm, wherein the ratio of the length of the effective area in the lateral direction to the length of the effective area in the longitudinal direction is one-tenth.

FIG. 9A, FIG. 9B, FIG. 9C, FIG. 9D, and FIG. 9E are diagrams illustrating the resolution performance of the imaging optical system of numerical value practical example 1. The vertical axes of graphs illustrated in FIG. 9A, FIG. 9B, FIG. 9C, FIG. 9D, and FIG. 9E indicate the values of composite MTF (Modulation Transfer Function) of three wavelengths of RGB (R: 612 nm, G: 546 nm, and B: 448 nm) and the horizontal axes of graphs illustrated in FIG. 9A, FIG. 9B, FIG. 9C, FIG. 9D, and FIG. 9E indicate the values of the defocus of the imaging optical system of numerical value practical example 1 with respect to an image surface in the direction of Z-axis. The graphs illustrated in FIG. 9A, FIG. 9B, FIG. 9C, FIG. 9D, and FIG. 9E indicate the resolution performance of the imaging optical system at the positions at which a light ray(s) emitted from the points of an object at heights of 0.0Y, 0.4Y, 0.7Y, 0.9Y, and 1.0Y, reaches an image surface, respectively, wherein "Y" is the distance from the center of the object to the point of the object at the maximum angle of view (=152.4 mm). Also, the solid lines in the graphs illustrated in FIG. 9A, FIG. 9B, FIG. 9C, FIG. 9D, and FIG. 9E indicate the values of MTF in Y-direction illustrated in FIG. 7, FIG. 8A and FIG. 8B, and the dotted lines in the graphs illustrated in FIG. 9A, FIG. 9B, FIG. 9C, FIG. 9D, and FIG. 9E indicate the values of MTF in X'-direction illustrated in FIG. 7, FIG. 8A and FIG. 8B. The values of MTF in the graphs indicated in FIG. 9A, FIG. 9B, FIG. 9C, FIG. 9D, and FIG. 9E indicate that the imaging optical system of numerical value practical example 1 has a good resolution performance for any of angles of view, and therefore, indicate a sufficient reading performance for a reading optical system in an image reading device.

Figure 10:
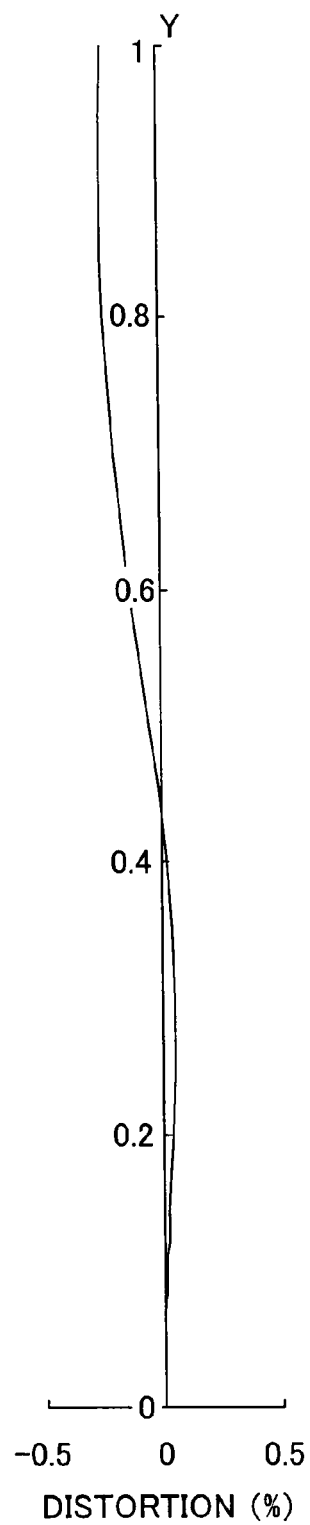
FIG. 10 is a diagram illustrating the distortion of the imaging optical system of numerical value practical example 1.

FIG. 10 is a diagram illustrating distortion of the imaging optical system of numerical value practical example 1. The horizontal axis of a graph illustrated in FIG. 10 indicates the value of distortion of the imaging optical system of numerical value practical example 1 for light at a wavelength of 546 nm and the vertical axis of the graph illustrated in FIG. 10 indicates an image height in an image surface. As illustrated in FIG. 10, the distortion of the imaging optical system of numerical value practical example 1 is corrected well and reduced sufficiently for a reading optical system in an image reading device.

Practical Example 6

Numerical Value Practical Example 2

Next, another design example of an imaging optical system in an image reading device according to one illustrative embodiment of the present invention will be described as a numerical value practical example 2 below.

Table 4 indicates surface numbers, radii of curvature, surface separations, refractive indices, and Abbe numbers of optical elements and the like which constitute an imaging optical system of numerical value practical example 2.

TABLE 4

| | Surface Number | Radius of Curvature | Surface Separation | Refractive Index | Abbe Number | Reflection Surface | Decentering |
|---|---|---|---|---|---|---|---|
| | Object | 0.000 | 5.888 | | | | |
| CG | 1 | 0.000 | 1.974 | 1.51678 | 64.2 | | |
| | 2 | 0.000 | 128.563 | | | | |
| Plane M | 3 | 0.000 | −30.000 | | | ○ | ○ |
| Concave M | 4 | 34.506 | 45.459 | | | ○ | ○ |
| L1 | 5 | 18.423 | 4.042 | 1.75520 | 27.6 | | |
| | 6 | 9.597 | 0.276 | | | | |
| L2 | 7 | 10.855 | 3.222 | 1.62041 | 60.3 | | |
| | 8 | −77.656 | 2.070 | | | | |
| Stop | 9 | 0.000 | 1.570 | | | | |
| L3 | 10 | 23.676 | 1.172 | 1.75520 | 27.6 | | |
| | 11 | 15.521 | 0.248 | | | | |
| L4 | 12 | 17.778 | 7.399 | 1.55548 | 64.3 | | |
| | 13 | −21.889 | 26.657 | | | | |
| CG | 14 | 0.000 | 0.470 | 1.51678 | 64.2 | | |
| | 15 | 0.000 | 1.000 | | | | |
| | Image | 0.000 | 0.000 | | | | |

Herein, the refractive indices indicated in Table 4 are their values for d-line (587.56 nm).

Furthermore, reflection surfaces are indicated by "○" marks in Table 4. Reflection surfaces in the imaging optical system of numerical value practical example 2 are the third surface and the fourth surface. The number of a planar mirror for folding the optical path of the imaging optical system, which is used in the imaging optical system of numerical value practical example 2, is only one and the third surface is a planar mirror for folding the optical path of the imaging optical system.

The fourth surface is a reflection surface having a positive power, and herein, an anamorphic and free-form surface represented by the formula as described in numerical value practical example 1.

Table 5 indicates the data of the anamorphic and aspherical surface, which is the fourth surface in the imaging optical system of numerical value practical example 2.

TABLE 5

| 1/c | 34.506 |
|---|---|
| k | 0 |
| X4Y0 | −1.52E−04 |
| X2Y2 | 2.95E−05 |
| X0Y4 | −1.71E−06 |
| X5Y0 | 8.21E−05 |
| X3Y2 | −3.08E−06 |
| X1Y4 | 3.59E−07 |
| X6Y0 | −1.55E−05 |
| X4Y2 | −5.15E−07 |
| X2Y4 | −1.29E−07 |
| X0Y6 | −1.62E−09 |
| X7Y0 | 3.50E−07 |
| X5Y2 | 3.86E−08 |
| X3Y4 | 1.70E−08 |
| X1Y6 | −3.29E−10 |
| X8Y0 | 2.67E−07 |
| X6Y2 | 2.72E−08 |
| X4Y4 | 3.99E−10 |
| X2Y6 | 1.18E−10 |
| X0Y8 | 1.82E−12 |
| X9Y0 | −3.50E−08 |
| X7Y2 | −4.66E−09 |
| X5Y4 | −2.86E−10 |
| X3Y6 | −1.80E−11 |
| X1Y8 | 3.78E−14 |
| X10Y0 | 1.37E−09 |
| X8Y2 | 2.18E−10 |
| X6Y4 | 1.75E−11 |

TABLE 5-continued

| X4Y6 | 1.05E−12 |
|---|---|
| X2Y8 | −1.18E−14 |
| X0Y10 | −2.46E−15 |

Additionally, decentering is also indicated by "○" marks in Table 5. The third surface and the fourth surface are also decentered in the imaging optical system of numerical value practical example 2, similarly to the imaging optical system of numerical value practical example 1.

Table 6 indicates the data of the amount of decentering of the third surface and fourth surface in the imaging optical system of numerical value practical example 2.

TABLE 6

| | Surface Number 3 |
|---|---|
| X directional Shift (mm) | 0.000 |
| XZ in-plane rotation (°) | −16.03 |

| | Surface Number 4 |
|---|---|
| X directional Shift (mm) | −11.439 |
| X′ Z′ in-plane rotation (°) | −20.32 |

Figure 11:
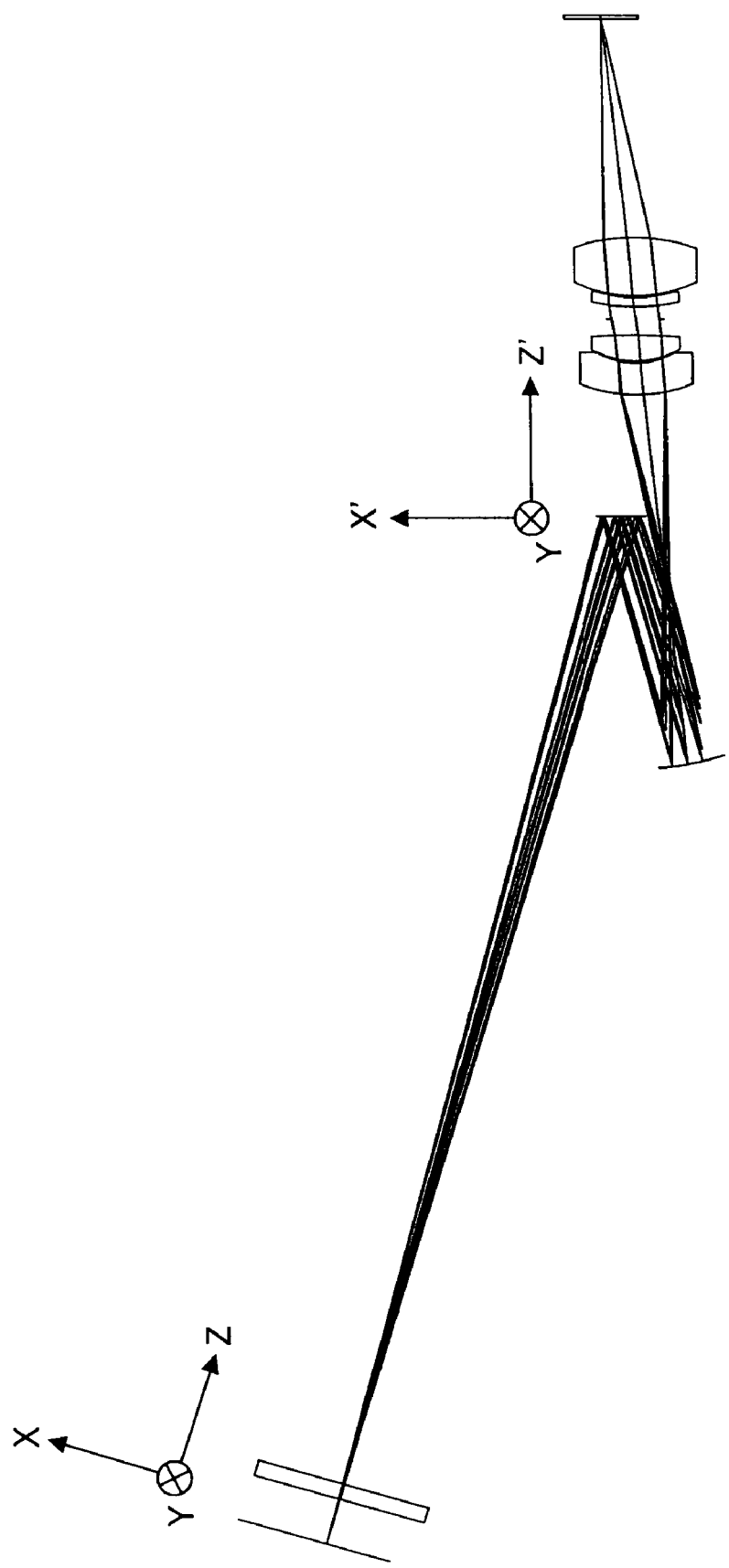
FIG. 11 is a diagram illustrating the configuration of an imaging optical system of numerical value practical example 2 in an image reading device according to one embodiment of the present invention.
Figure 12A:
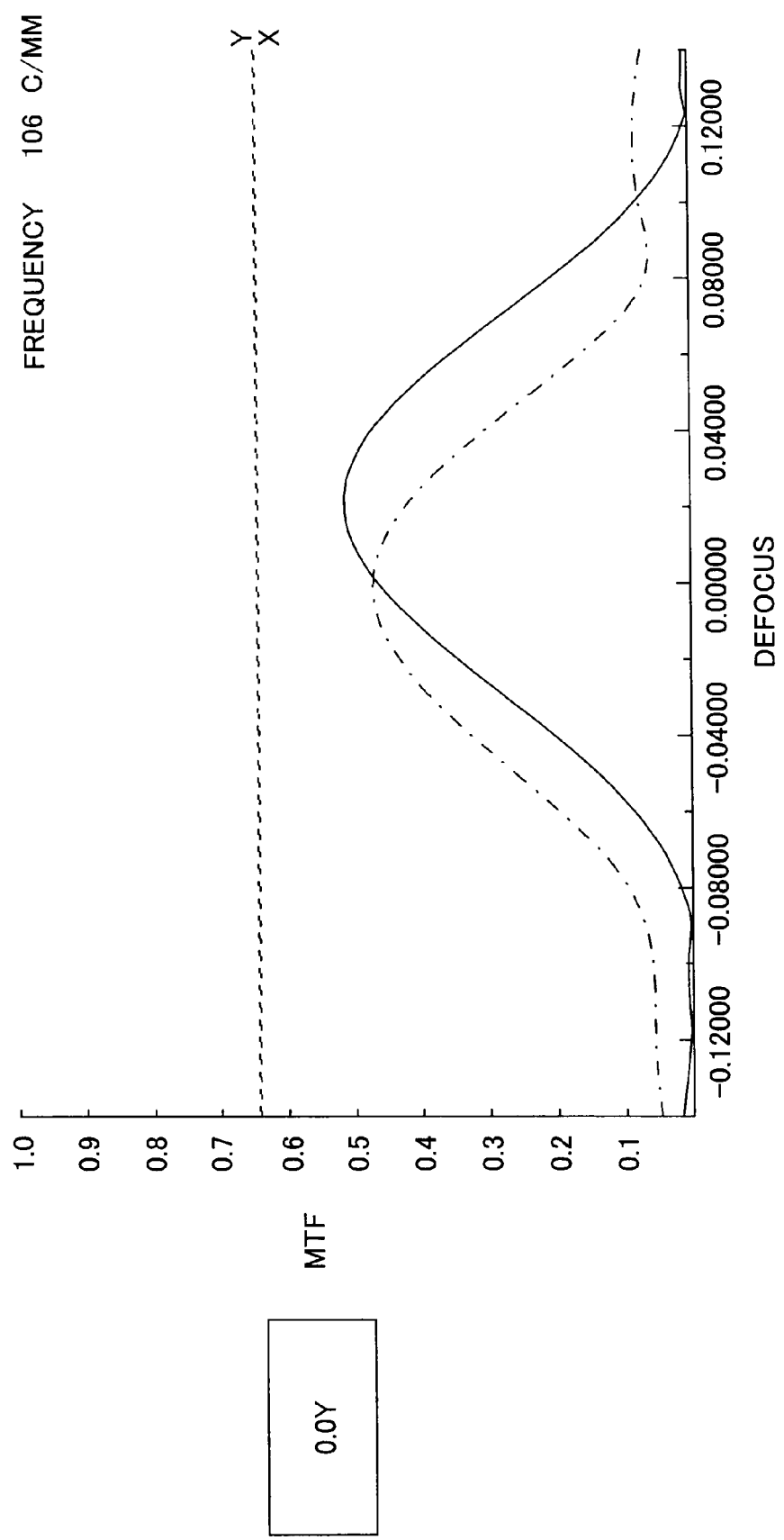
FIG. 12A, FIG. 12B, FIG. 12C, FIG. 12D, and FIG. 12E are diagrams illustrating the resolution performance of the imaging optical system of numerical value practical example 2.
Figure 12B:
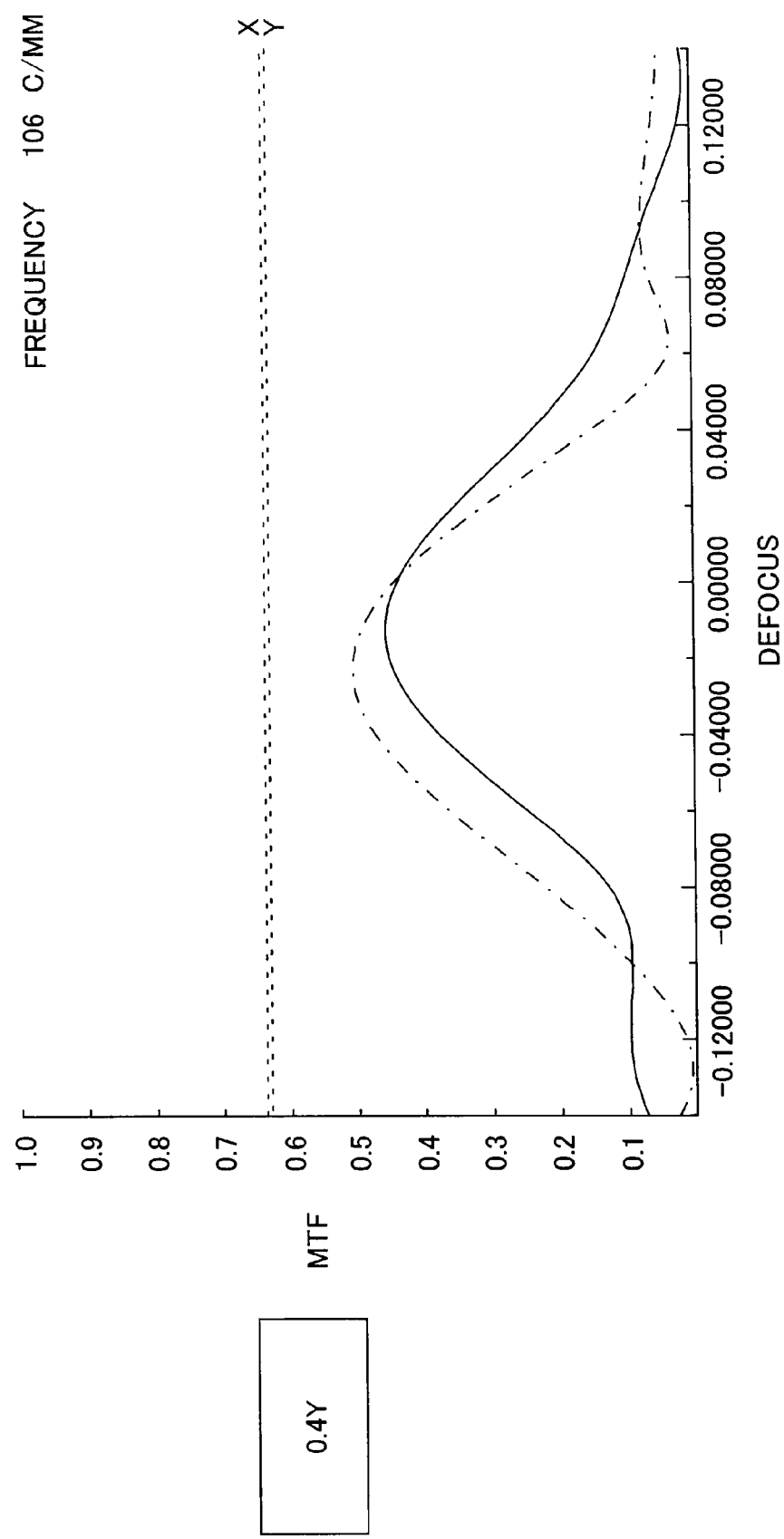
Figure 12C:
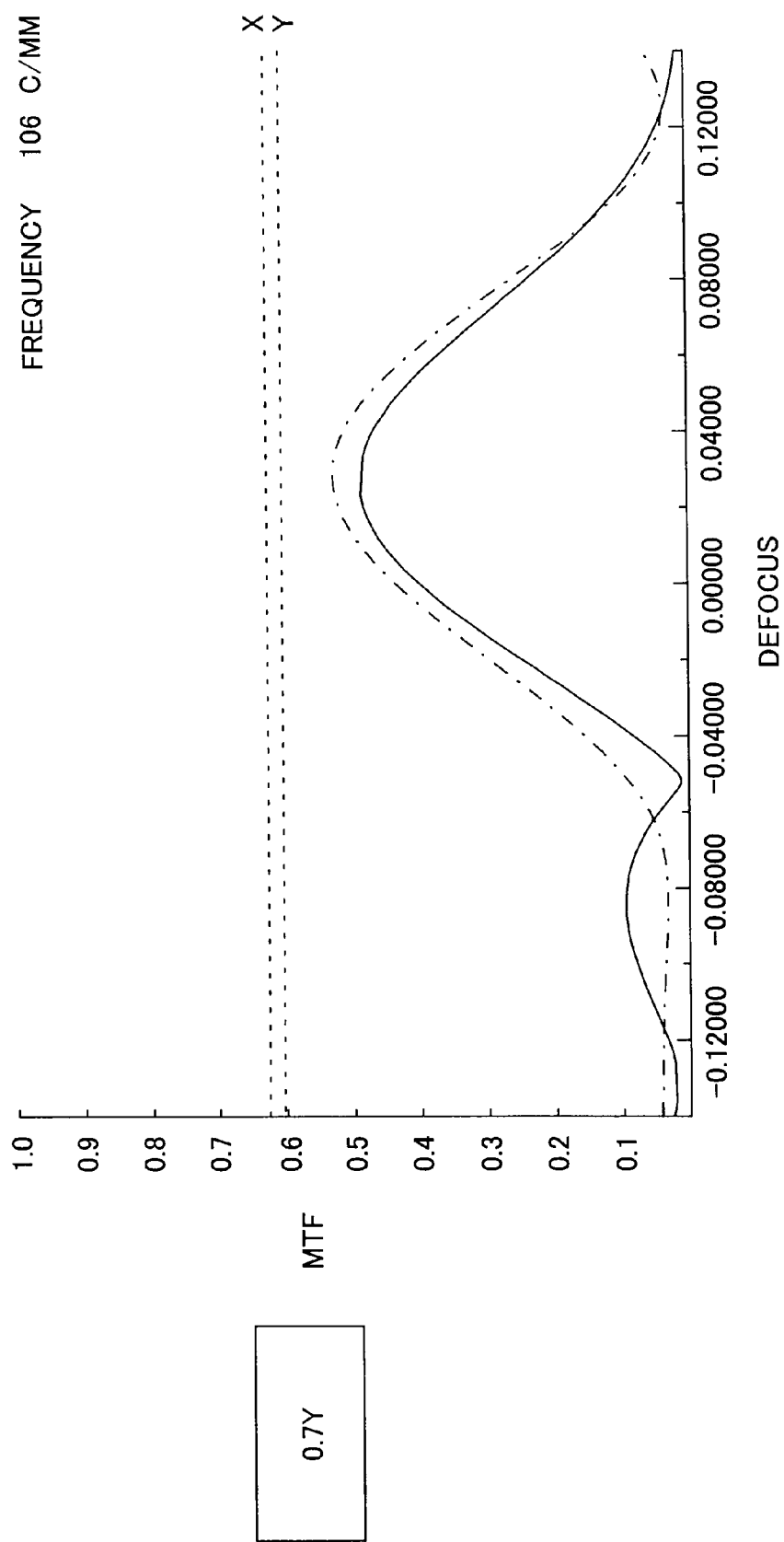
Figure 12D:
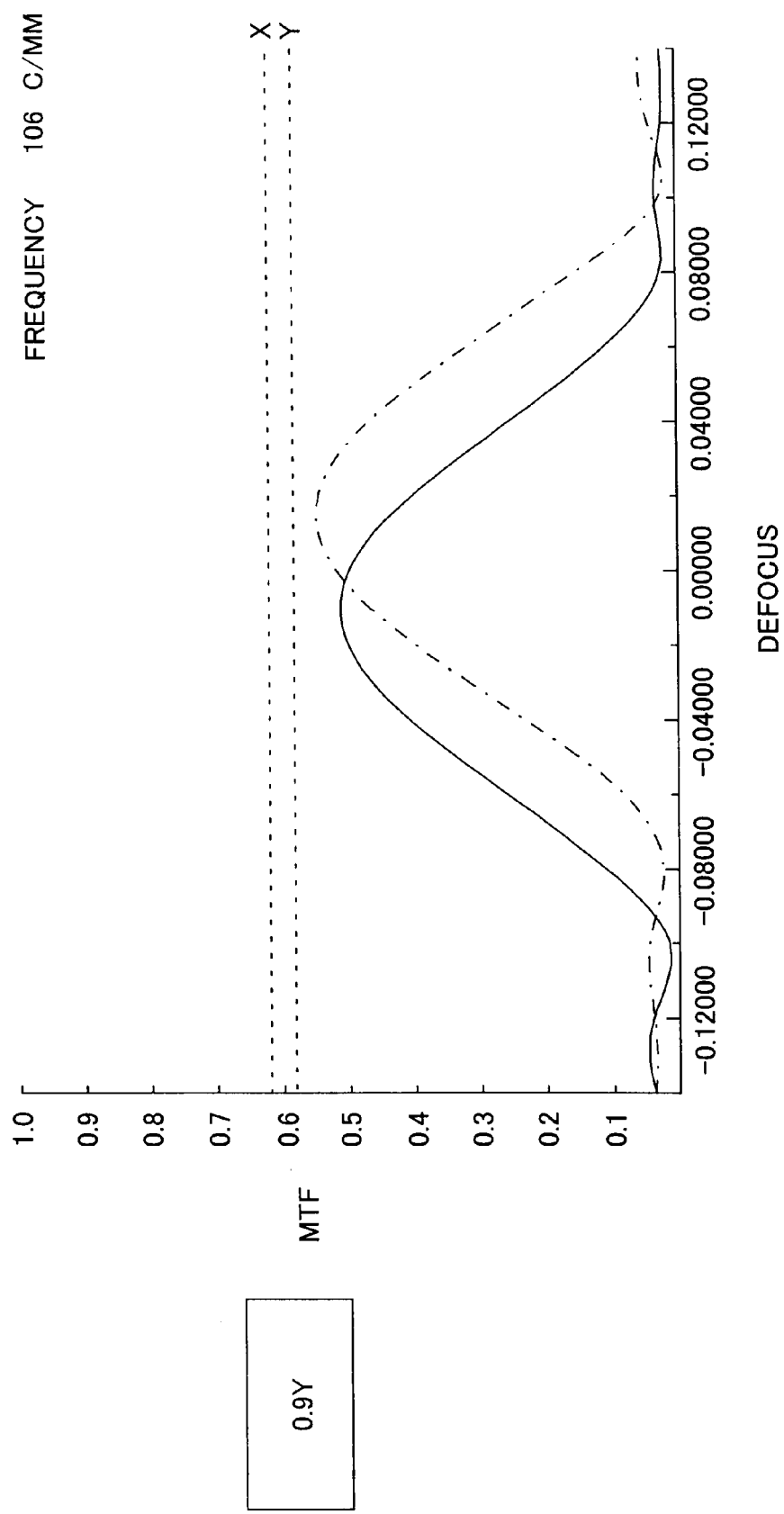
Figure 12E:
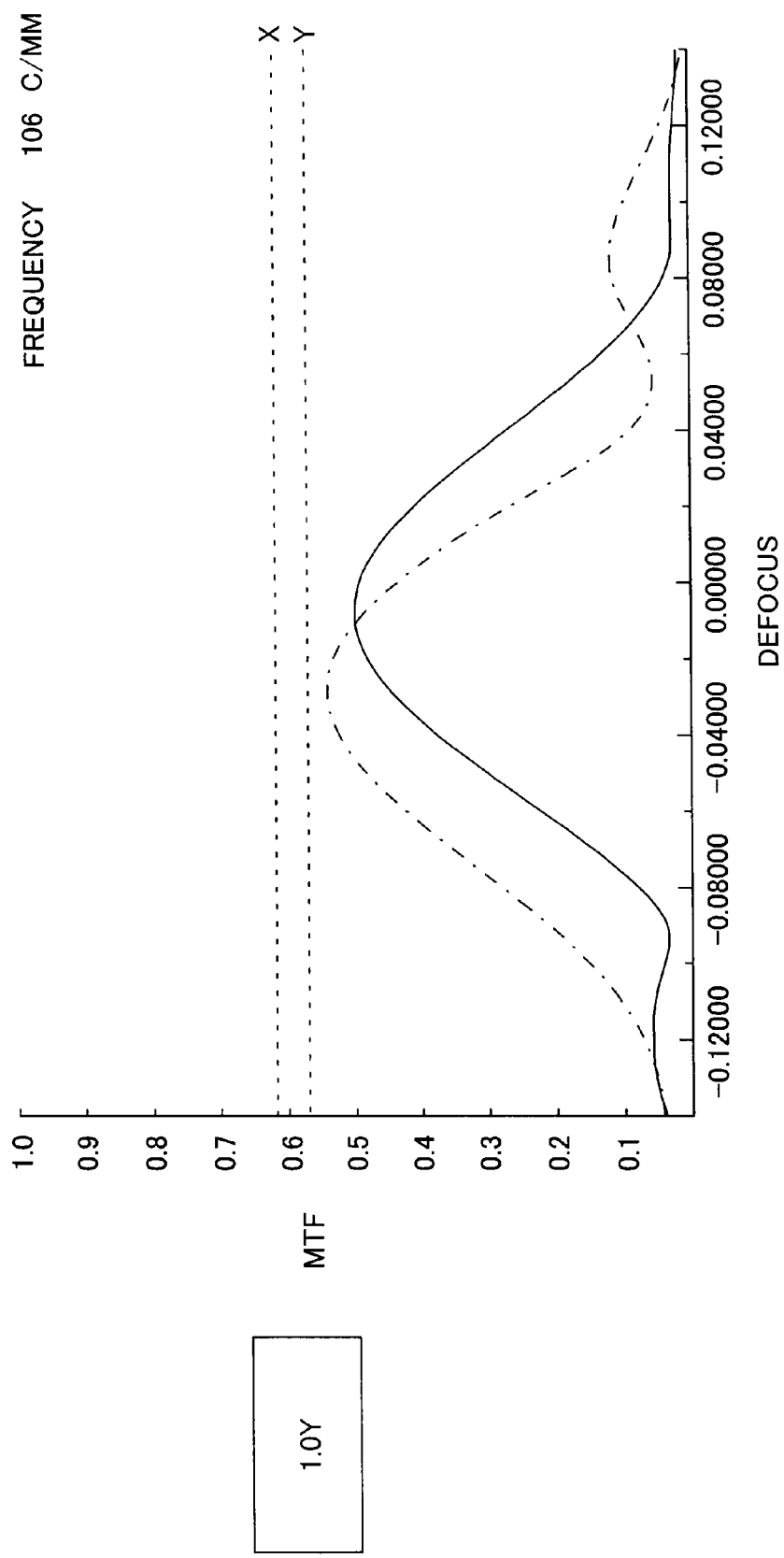

FIG. 11 is a diagram illustrating the configuration of the imaging optical system of numerical value practical example 2 in an image reading device according to one illustrative embodiment of the present invention. More particularly, FIG. 11 is a cross-section diagram of the imaging optical system of numerical value practical example 2 in XZ plane illustrated in FIG. 11. As illustrated in FIG. 11, the data behind the third surface which are provided in Table 4 are expressed by a new X′Z′ coordinate system obtained by means of rotation by the amount of decentering of the third surface, −16.03°, indicated in Table 6, in XZ-plane around Y-direction indicated in FIG. 11. Furthermore, the decentering of the fourth surface is its decentering in a local coordinate system which operates on only the fourth surface and the coordinate system for surfaces behind the fourth surface is not influenced by the decentering of the fourth surface.

Similarly to the imaging optical system of numerical value practical example 1, the imaging optical system of numerical value practical example 2 is a reading optical system for an image reading device with a reading density of 600 dpi which reduces and images the original copy surface of an original copy with a size if A3 on an one-dimensional image-capturing device with a pixel pitch of 4.7 µm, and the reduction ratio "m" of the imaging optical system of numerical value practical example 2 is 0.11102. Also, similarly to the imaging optical system of numerical value practical example 1, the brightness of the imaging optical system of numerical value practical example 2 is Fno=5.0 which provides a sufficiently bright imaging optical system as a reading optical system for image reading device. Furthermore, the half angle of view of the imaging optical system of numerical value practical example 2 is 47.6° and the imaging optical system of numerical value practical example 2 which uses a reflection surface having a positive power and an intermediate image is a wide angle optical system. Moreover, although the imaging optical system of numerical value practical example 2 is a wide angle optical system, the object-to-image distance from an object to an image for the imaging optical system of numerical value practical example 2 is 263.0 mm which is very short as compared to the object-to-image distance for a reading optical system for conventional image reading device. Furthermore, all the lenses included in the imaging optical system of numerical value practical example 2 (and constituting a lens system having a positive power) are spherical lenses and the number of the lenses included in the imaging optical system of numerical value practical example 2 is 4 wherein the number of lenses is, for example, less than the number of lenses in a reading optical system composed of only lenses and further less than the number of lenses included in the imaging optical system of numerical value practical example 1 by one. Moreover, the effective area of the reflection surface having a positive power is rectangular as the arrangement of pixels of a one-dimensional image-capturing device is taken into consideration. More particularly, the length of the effective area of the reflection surface having a positive power in the longitudinal direction thereof which corresponds to the direction of arrangement of pixels of a one-dimensional image-capturing device is 50 mm and the length of the (maximum) effective area of the reflection surface having a positive power in the lateral direction thereof which corresponds to the direction perpendicular to the direction of arrangement of pixels of the one-dimensional image-capturing device (and the optical axis of a lens system having a positive power) is 5 mm, wherein the ratio of the length of the effective area in the lateral direction to the length of the effective area in the longitudinal direction is one-tenth.

FIG. 12A, FIG. 12B, FIG. 12C, FIG. 12D, and FIG. 12E are diagrams illustrating the resolution performance of the imaging optical system of numerical value practical example 2. The vertical axes of graphs illustrated in FIG. 12A, FIG. 12B, FIG. 12C, FIG. 12D, and FIG. 12E indicate the values of composite MTF (Modulation Transfer Function) of three wavelengths of RGB (R: 612 nm, G: 546 nm, and B: 448 nm) and the horizontal axes of graphs illustrated in FIG. 12A, FIG. 12B, FIG. 12C, FIG. 12D, and FIG. 12E indicate the values of the defocus of the imaging optical system of numerical value practical example 2 with respect to an image surface in the direction of Z-axis. The graphs illustrated in FIG. 12A, FIG. 12B, FIG. 12C, FIG. 12D, and FIG. 12E indicate the resolution performance of the imaging optical system at the positions at which a light ray(s) emitted from the points of an object at heights of 0.0Y, 0.4Y, 0.7Y, 0.9Y, and 1.0Y, reaches an image surface, respectively, wherein "Y" is the distance from the center of the object to the point of the object at the maximum angle of view (=152.4 mm). Also, the solid lines in the graphs illustrated in FIG. 12A, FIG. 12B, FIG. 12C, FIG. 12D, and FIG. 12E indicate the values of MTF in Y-direction illustrated in FIG. 11, and the dotted lines in the graphs illustrated in FIG. 12A, FIG. 12B, FIG. 12C, FIG. 12D, and FIG. 12E indicate the values of MTF in X'-direction illustrated in FIG. 11. The values of MTF in the graphs indicated in FIG. 12A, FIG. 12B, FIG. 12C, FIG. 12D, and FIG. 12E indicate that the imaging optical system of numerical value practical example 2 has a good resolution performance for any of angles of view, and therefore, indicate a sufficient reading performance for a reading optical system in an image reading device.

Figure 13:
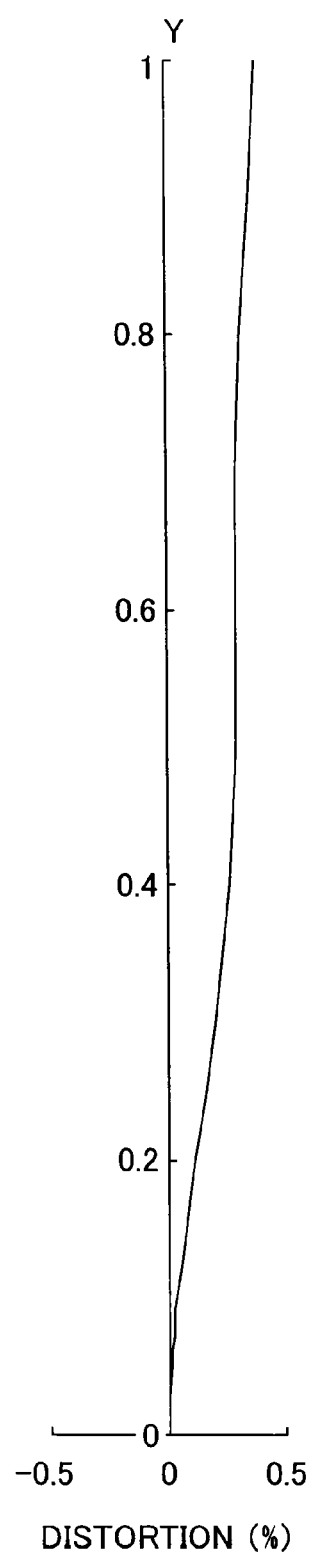
FIG. 13 is a diagram illustrating the distortion of the imaging optical system of numerical value practical example 2.

FIG. 13 is a diagram illustrating distortion of the imaging optical system of numerical value practical example 2. The horizontal axis of a graph illustrated in FIG. 13 indicates the value of distortion of the imaging optical system of numerical value practical example 2 for light at a wavelength of 546 nm and the vertical axis of the graph illustrated in FIG. 13 indicates an image height in an image surface. As illustrated in FIG. 13, the distortion of the imaging optical system of numerical value practical example 2 is corrected well and reduced sufficiently for a reading optical system in an image reading device.

Practical Example 7

Figure 14:
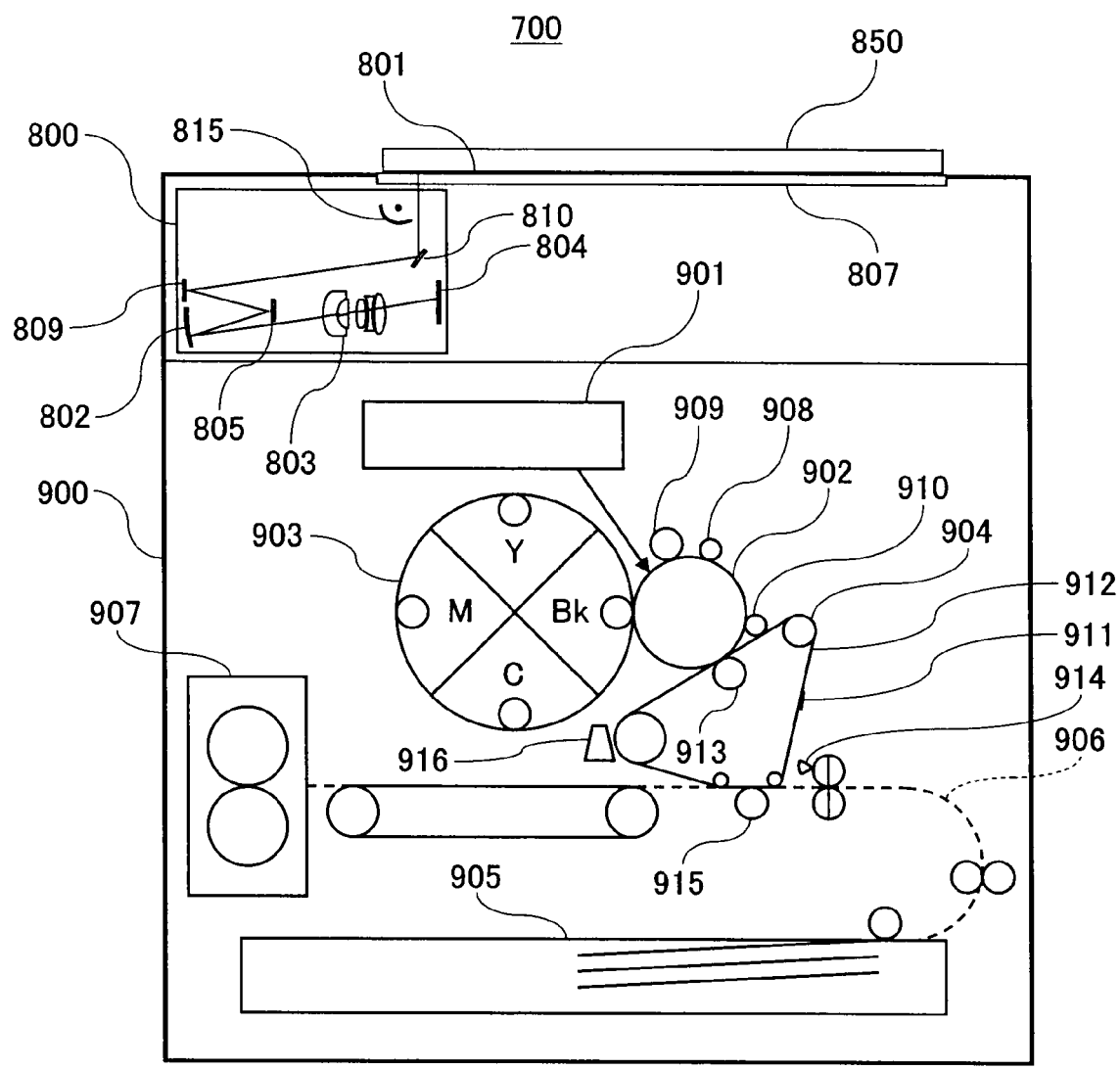
FIG. 14 is a diagram illustrating one example of an image forming apparatus according to one embodiment of the present invention.

FIG. 14 is a diagram illustrating one example of an image forming apparatus according to one illustrative embodiment of the present invention.

A copying machine 700 is an image forming apparatus for forming an image by conducting an electrophotographic process. The copying machine 700 includes an image scanner 800 for reading information of a picture in an electrophotographic process and a printer 900 arranged under it. Herein, the image scanner 800 is an example of an image reading device according to one illustrative embodiment of the present invention.

First, the configuration and operation of the image scanner 800 will be described. For an image reading part of the image scanner 800, a transparent contact glass 807 is provided which functions as a table for an original copy 801 such as a paper sheet or a plastic film and an openable and closable pressure plate 850 is arranged above it. The color of the inner surface of the pressure plate 350, that is, its part opposing the back surface of the original copy 801 is white. Under the contact glass 807, there is provided a reading optical system included in an image reading device according to one illustrative embodiment of the present invention. The reading optical system includes a light exposure lamp 815, planar mirrors 805, 809, and 810, a reflection surface having a positive power 802, a lens system having a positive power 803, and an image-capturing device 804. The reading optical system is mechanically driven in the left and right directions of the original copy surface. Light emitted from the light exposure lamp 815 is reflected from the original copy 801 or the inner surface of the pressure plate 850 and the reflected light passes through the planar mirrors 810, 809, 805, the reflection surface having a positive power 802 and the lens system having a positive power 803 and is incident on the image-capturing device 804. Herein, because an intermediate image is formed between the reflection surface having a positive power 802 and the lens system having a positive power 803, the object-to-image distance for the reading optical system is reduced while the reading optical system is a wide angle optical system. As a result, it may be possible to reduce the height of the image scanner 800.

Second, the configuration and operation of the printer 900 will be described. The printer 900 for conducting operations of formation and transfer of an image includes a writing unit 901, a photoconductor body 902, a revolver unit 903, a transfer unit 904, a paper feed unit 905, a transfer paper conveyance route 906, and a fixation unit 907. Around the photoconductor body 902, there are provided an antistatic lamp 908, a charging charger 909, the revolver unit 903, the transfer unit 904, and a drum cleaning part 910 along the rotational direction of the photoconductor body 902. The revolver unit 903 includes development machines of respective colors such as black (Bk), cyan (C), magenta (M), and yellow (Y). The transfer unit 904 extends on plural rollers, is revolved, and includes an intermediate transfer belt 912 having a belt mark 911, a primary transfer roller 913, a positioning sensor 914 for reading the belt mark 911, a secondary transfer roller 915, and a belt cleaning part 916.

First, after a predetermined image processing is applied to information of a picture read by the image scanner 800, an electrostatic latent image is formed on the photoconductor body 902 that is electrostatically charged by the charging charger 909, by using a writing unit 901 or the like, including a laser light source or the like, based on the processed information of a picture. Then, the electrostatic latent image formed on the photoconductor body 902 is developed with developers containing a toner which are prepared in the development machines of respective colors included in the revolver unit 903, so that a toner image which is a copy image is formed on the photoconductor body 902. The toner image formed on the photoconductor body 902 is primarily transferred to the intermediate transfer belt 912. Herein, image formation on the photoconductor body 902 and primary transfer of a toner image to the intermediate transfer belt 912 are repeated based on detection of the belt mark 911 for respective colors so that certain color images are superimposed on the intermediate transfer belt 912. Then, while the timing of the leading end of the toner image transferred to the intermediate transfer belt 912 is controlled, the toner image is secondarily transferred to transfer paper sheets that are sequentially paper-fed. Then, the toner image transferred to the transfer paper sheets is fixed by using the fixation unit 907 and the transfer paper sheets on which the toner image is fixed are ejected from the printer 900. Finally, the toner remaining on the intermediate transfer belt 912 is recovered by using the cleaning part 916.

Herein, because the image scanner 800 is an example of an image reading device according to one illustrative embodiment of the present invention, the copying machine 700 may be a compact image forming apparatus and it may be possible to attain formation of a good image, that is, output of an image with a high image quality.

Although the illustrative embodiments and specific examples of the present invention have been described above with reference to the accompanying drawings, the present invention is not limited to any of the illustrative embodiments and specific examples and the illustrative embodiments and specific examples may be altered, modified, or combined without departing from the spirit and scope of the present invention.

APPENDIX

Next, at least one embodiment of the present invention will be described below.

An embodiment of the present invention relates to at least one of an image reading device, an image reading method, an image forming apparatus, and an image forming method.

One object of an embodiment of the present invention is to provide a more compact image reading device.

Another object of an embodiment of the present invention is to provide an image reading method using a more compact image reading device.

Another object of an embodiment of the present invention is to provide an image forming apparatus including a more compact image reading device.

Another object of an embodiment of the present invention is to provide an image forming method using an image forming apparatus including a more compact image reading device.

Embodiment (1) of the present invention is an image reading device configured to read information of an object, which includes an imaging optical system configured to image an image of an object and an image-capturing device configured to image-capture at least a portion of the image imaged by the imaging optical system, characterized in that the imaging optical system includes a first optical system configured to image an intermediate image of the object and a second optical system configured to image the imaged image of the intermediate image.

Embodiment (2) of the present invention is the image reading device as described in embodiment (1) above, characterized in that the first optical system includes a reflection surface having a positive power and the second optical system includes a lens system having an optical axis and having a positive power.

Embodiment (3) of the present invention is the image reading device as described in embodiment (1) or (2) above, characterized in that the imaging optical system further includes at least one reflection surface folding an optical path from the object to the imaged image and having no power.

Embodiment (4) of the present invention is the image reading device as described in embodiment (3) above, characterized in that the at least one reflection surface folding an optical path from the object to the imaged image and having no power includes at least one reflection surface folding an optical path from the object to the reflection surface having a positive power and having no power.

Embodiment (5) of the present invention is the image reading device as described in embodiment (4) above, characterized in that a reflection surface having no power closest to the reflection surface having a positive power in the at least one reflection surface folding an optical path from the object to the reflection surface having a positive power and having no power is arranged at a position of the intermediate image or a position between the intermediate image and the lens system having a positive power with respect to a direction of the optical axis of the lens system.

Embodiment (6) of the present invention is the image reading device as described in embodiment (4) or (5) above, characterized in that a reflection surface having no power closest to the reflection surface having a positive power in the at least one reflection surface folding an optical path from the object to the reflection surface having a positive power and having no power is arranged at a position of an entrance pupil of any one of a light ray(s) incident from the object to the reflection surface having a positive power.

Embodiment (7) of the present invention is the image reading device as described in any of embodiments (2) to (6) above, characterized in that a number of a lens(es) constituting the lens system and having a power is 3 or more and 6 or less.

Embodiment (8) of the present invention is the image reading device as described in any of embodiments (2) to (7) above, characterized in that an image surface of the intermediate image is curved so as to get closer to the lens system with increasing a distance from the optical axis of the lens system.

Embodiment (9) of the present invention is the image reading device as described in any of embodiments (2) to (8) above, characterized in that the reflection surface having a positive power has a shape of an anamorphic and aspherical surface.

Embodiment (10) of the present invention is the image reading device as described in any of embodiments (2) to (9) above, characterized in that the image-capturing device has pixels arranged in at least a first direction and is shifted to a direction perpendicular to both the first direction and a direction of the optical axis of the lens system with respect to the optical axis of the lens system.

Embodiment (11) of the present invention is the image reading device as described in any of embodiments (2) to (10) above, characterized in that the image-capturing device has pixels arranged in at least a first direction and a length of the reflection surface having a positive power in a direction perpendicular to both the first direction and a direction of the optical axis of the lens system is a half or less of a length of the reflection surface having a positive power in the first direction.

Embodiment (12) of the present invention is the image reading device as described in any of embodiments (3) to (11) above, characterized in that the image-capturing device has pixels arranged in at least a first direction and a length of the at least one reflection surface folding an optical path from the object to the imaged image and having no power in the first direction is less than a length of the reflection surface having a positive power in the first direction.

Embodiment (13) of the present invention is an image reading method configured to read information of an object, characterized in that reading of information of an object using the image reading device as described in any of embodiments (1) to (12) above is included.

Embodiment (14) of the present invention is an image forming apparatus configured to form an image on an image carrier, characterized in that the image reading device as described in any of embodiments (1) to (12) above and a device configured to form an image on the image carrier using information of an object read by the image reading device are included.

Embodiment (15) of the present invention is an image forming method configured to form an image on an image carrier, characterized in that forming of an image on the image carrier using the image forming apparatus as described in embodiment (14) above is included.

According to an embodiment of the present invention, it may be possible to provide a more compact image reading device.

According to an embodiment of the present invention, it may be possible to provide an image reading method using a more compact image reading device.

According to an embodiment of the present invention, it may be possible to provide an image forming apparatus including a more compact image reading device.

According to an embodiment of the present invention, it may be possible to provide an image forming method using an image forming apparatus including a more compact image reading device.

It is considered that it may be possible to apply at least one embodiment of the present invention to at least one of an image reading device, an image reading method, an image forming apparatus, and an image forming method.

The present application claims the benefit of its priority based on Japanese Patent Application No. 2008-192835 filed on Jul. 25, 2008 in Japan, the entire contents of which are hereby incorporated by reference herein.

What is claimed is:

1. An image reading device, comprising:
   an imaging optical system configured to provide a final image conjugate to an object; and
   an image capturing device configured to capture at least a portion of the final image and read information of the object therefrom,
   wherein
   the imaging optical system comprises a first optical system configured to provide an intermediate image conjugate to the object and a second optical system configured to provide the final image conjugate to the intermediate image, and
   the first optical system comprises a reflection surface having a positive power and the second optical system comprises a lens system having an optical axis and having a positive power.

2. The image reading device as claimed in claim 1, wherein a number of a lens(es) constituting the lens system and having a power is 3 or more and 6 or less.

3. The image reading device as claimed in claim 1, wherein an image surface of the intermediate image is curved so as to get closer to the lens system with increasing a distance from the optical axis of the lens system.

4. The image reading device as claimed in claim 1, wherein the reflection surface having a positive power has a shape of an anamorphic and aspherical surface.

5. The image reading device as claimed in claim 1, wherein the image capturing device has pixels arranged in at least a first direction and is shifted to a direction perpendicular to both the first direction and a direction of the optical axis of the lens system with respect to the optical axis of the lens system.

6. The image reading device as claimed in claim 1, wherein the image capturing device has pixels arranged in at least a first direction and a length of the reflection surface having a positive power in a direction perpendicular to both the first direction and a direction of the optical axis of the lens system is a half or less of a length of the reflection surface having a positive power in the first direction.

7. An image reading device, comprising:
  an imaging optical system configured to provide a final image conjugate to an object; and
  an image capturing device configured to capture at least a portion of the final image and read information of the object therefrom,
  wherein
  the imaging optical system comprises a first optical system configured to provide an intermediate image conjugate to the object and a second optical system configured to provide the final image conjugate to the intermediate image, and
  the imaging optical system further comprises at least one reflection surface folding an optical path from the object to the final image and having no power.

8. The image reading device as claimed in claim 7, wherein the at least one reflection surface folding an optical path from the object to the final image and having no power comprises at least one reflection surface folding an optical path from the object to the reflection surface having a positive power and having no power.

9. The image reading device as claimed in claim 8, wherein a reflection surface having no power closest to the reflection surface having a positive power in the at least one reflection surface folding an optical path from the object to the reflection surface having a positive power and having no power is arranged at a position of the intermediate image or a position between the intermediate image and the lens system having a positive power with respect to a direction of the optical axis of the lens system.

10. The image reading device as claimed in claim 8, wherein a reflection surface having no power closest to the reflection surface having a positive power in the at least one reflection surface folding an optical path from the object to the reflection surface having a positive power and having no power is arranged at a position of an entrance pupil of any one of a light ray(s) incident from the object to the reflection surface having a positive power.

11. The image reading device as claimed in claim 7, wherein the image capturing device has pixels arranged in at least a first direction and a length of the at least one reflection surface folding an optical path from the object to the final image and having no power in the first direction is less than a length of the reflection surface having a positive power in the first direction.

12. An image forming apparatus, comprising:
  an image reading device, the image reading device comprising,
  an imaging optical system configured to provide a final image conjugate to an object,
  an image capturing device configured to capture at least a portion of the final image and read information of the object therefrom,
  an image carrier, and
  a device configured to form an image on the image carrier based on the information of the object,
  wherein
  the imaging optical system comprises a first optical system configured to provide an intermediate image conjugate to the object and a second optical system configured to provide the final image conjugate to the intermediate image.

* * * * *